US010661447B2

(12) United States Patent
Curhan et al.

(10) Patent No.: US 10,661,447 B2
(45) Date of Patent: *May 26, 2020

(54) END OF ARM TOOLS FOR SOFT ROBOTIC SYSTEMS

(71) Applicant: Soft Robotics, Inc., Cambridge, MA (US)

(72) Inventors: Jeffrey Curhan, Warwick, RI (US); Craig Demello, Newfields, NH (US); Thomas Womersley, Newton, MA (US)

(73) Assignee: Soft Robotics, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,604

(22) Filed: Oct. 15, 2018

(65) Prior Publication Data

US 2019/0061170 A1 Feb. 28, 2019

Related U.S. Application Data

(63) Continuation-in-part of application No. 15/411,212, filed on Jan. 20, 2017, now Pat. No. 10,179,411.

(Continued)

(51) Int. Cl.
*B25J 15/06* (2006.01)
*B25J 15/12* (2006.01)
(Continued)

(52) U.S. Cl.
CPC .......... *B25J 15/0023* (2013.01); *B25J 9/142* (2013.01); *B25J 15/0061* (2013.01);
(Continued)

(58) Field of Classification Search
CPC . B25J 9/142; B25J 9/1697; B25J 13/08; B25J 13/088; B25J 15/0023;
(Continued)

(56) References Cited

U.S. PATENT DOCUMENTS

| 3,343,864 | A | * | 9/1967 | Baer | ..................... B25J 15/0009 |
| | | | | | 294/119.3 |
| 3,601,442 | A | * | 8/1971 | Orndorff | ............... B25J 15/0023 |
| | | | | | 294/119.3 |

(Continued)

FOREIGN PATENT DOCUMENTS

| EP | 1750910 A1 | 2/2007 |
| JP | 2013166215 A | 8/2013 |

OTHER PUBLICATIONS

International Search Report and Written Opinion for application No. PCT/US2018/055883, dated Jan. 30, 2019, 12 pages.

*Primary Examiner* — Dean J Kramer

(57) ABSTRACT

Exemplary embodiments relate to unique structures for robotic end-of-arm-tools (EOATs). According to some embodiments, two or more fingers or actuators may be present on an EOAT, and the actuators may be configured to move (together or separately) to adjust the spacing between the actuators. Some aspects involve techniques for extending and/or retracting a vacuum cup present on the EOAT. Further embodiments, which may be used separately or in conjunction with the previously-described embodiments, apply a secondary inner grip pad to provide a secondary gripping mode for the EOAT. These embodiments may be particularly advantageous when the actuators are soft robotic actuators and the inner grip pad is a relatively more rigid structure than the actuators.

18 Claims, 23 Drawing Sheets

Related U.S. Application Data

(60) Provisional application No. 62/571,916, filed on Oct. 13, 2017, provisional application No. 62/280,802, filed on Jan. 20, 2016.

(51) Int. Cl.
  *B25J 19/04* (2006.01)
  *B25J 15/00* (2006.01)
  *B25J 15/10* (2006.01)
  *B25J 15/02* (2006.01)
  *B25J 9/14* (2006.01)

(52) U.S. Cl.
  CPC ......... *B25J 15/026* (2013.01); *B25J 15/0616* (2013.01); *B25J 15/10* (2013.01); *B25J 15/103* (2013.01); *B25J 15/12* (2013.01); *B25J 19/04* (2013.01)

(58) Field of Classification Search
  CPC .. B25J 15/0061; B25J 15/026; B25J 15/0266; B25J 15/0616; B25J 15/10; B25J 15/103; B25J 15/12; B25J 19/023; B25J 19/04; Y10S 294/907
  USPC .................................................. 294/86.4, 185
  See application file for complete search history.

(56) References Cited

U.S. PATENT DOCUMENTS

| | | | | |
|---|---|---|---|---|
| 3,640,564 A * | 2/1972 | Kuster | ................... | B25B 11/00 294/119.3 |
| 4,273,505 A * | 6/1981 | Clark | ................... | B25J 15/0023 279/2.08 |
| 4,403,801 A * | 9/1983 | Huff | ................... | B25J 15/0023 294/119.3 |
| 4,448,405 A | 5/1984 | Cipolla | | |
| 4,547,121 A * | 10/1985 | Nesmith | ................ | B25J 18/025 212/230 |
| 4,706,949 A | 11/1987 | Dossey et al. | | |
| 4,715,637 A * | 12/1987 | Hosoda | ................. | B25J 9/1085 294/106 |
| 4,770,456 A * | 9/1988 | Phillips | ................... | B25J 15/00 279/2.17 |
| 5,062,761 A * | 11/1991 | Glachet | ................. | B25J 18/025 414/4 |
| 5,090,758 A * | 2/1992 | Lord | .................... | B25J 15/0023 294/119.3 |
| 5,125,789 A * | 6/1992 | Farr | ......................... | B25J 9/023 414/728 |
| 5,163,665 A | 11/1992 | Klearman | | |
| 5,245,885 A * | 9/1993 | Robertson | ........... | B25J 15/0009 294/119.3 |
| 5,250,074 A * | 10/1993 | Wilk | .................... | A61B 17/12 606/158 |
| 5,385,080 A * | 1/1995 | Suzumori | ............... | B25J 15/12 91/525 |
| 5,403,056 A * | 4/1995 | Wallace | ............... | B25J 15/0023 294/98.1 |
| 6,846,029 B1 * | 1/2005 | Ragner | .................... | B25B 9/00 294/219 |
| 7,475,927 B2 * | 1/2009 | Maffeis | ................... | B25J 15/12 279/2.17 |
| 8,210,586 B2 | 7/2012 | Hawes | | |
| 8,403,387 B2 | 3/2013 | Nakasugi et al. | | |
| 8,727,410 B2 * | 5/2014 | Jones | ....................... | B25J 5/005 294/183 |
| 8,979,151 B2 * | 3/2015 | Mukou | ................ | B25J 15/0206 294/106 |
| 9,046,177 B2 * | 6/2015 | Tell | ......................... | F16J 3/043 |
| 2004/0217612 A1 | 11/2004 | Slettedal | | |
| 2006/0033350 A1 * | 2/2006 | Besch | ..................... | B25B 5/065 294/119.3 |
| 2007/0276539 A1 * | 11/2007 | Habibi | .................. | B25J 9/1612 700/245 |
| 2013/0232918 A1 * | 9/2013 | Lomerson, Jr. | ...... | B25J 15/0052 53/452 |
| 2015/0375404 A1 * | 12/2015 | Matsuoka | ........... | B25J 15/0023 294/86.4 |
| 2016/0089793 A1 * | 3/2016 | Truebenbach | ....... | B25J 15/0616 324/750.25 |
| 2016/0107316 A1 * | 4/2016 | Alt | ......................... | B25J 9/1697 700/259 |
| 2016/0279805 A1 | 9/2016 | Murota et al. | | |
| 2017/0203443 A1 | 7/2017 | Lessing et al. | | |

* cited by examiner

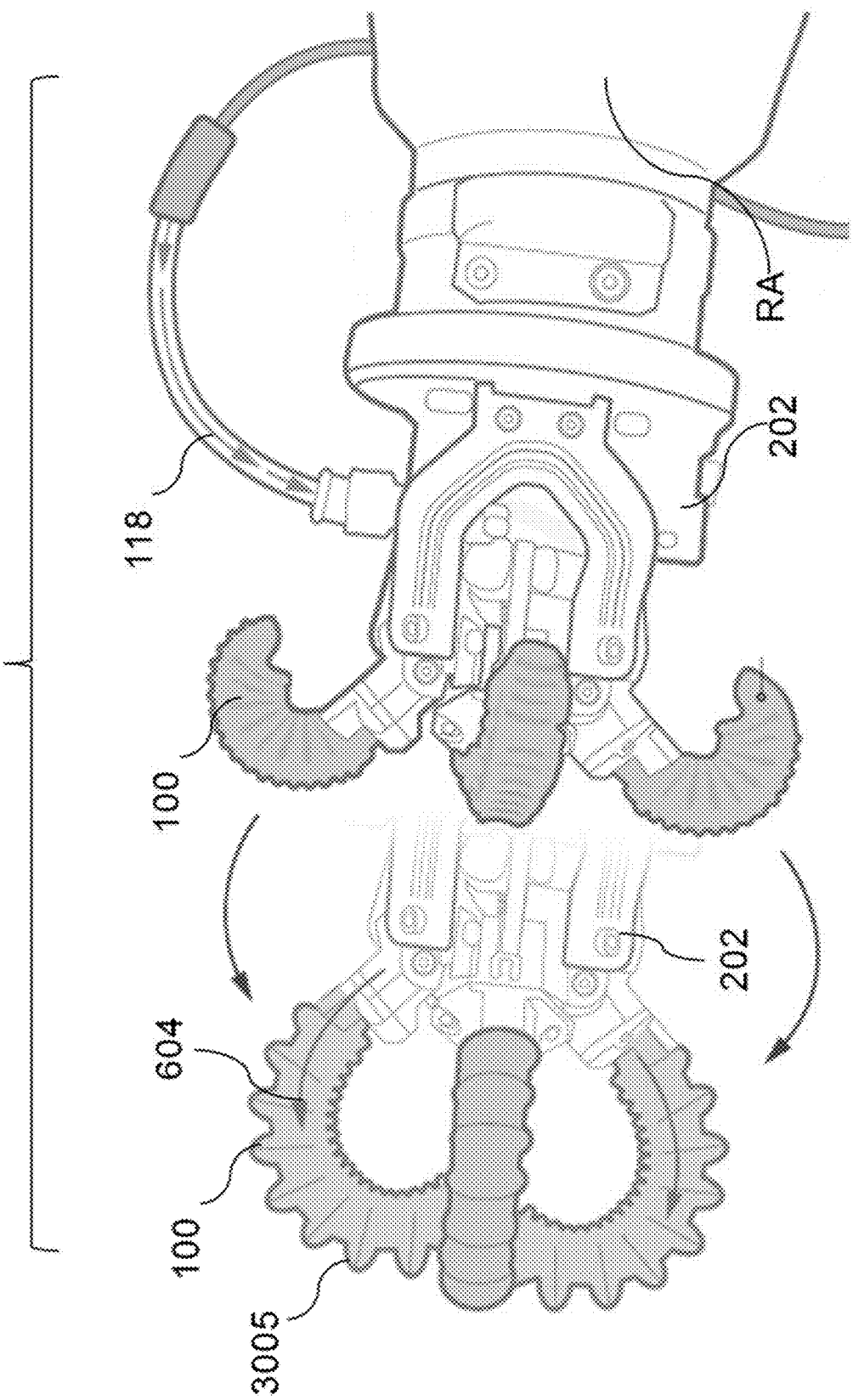

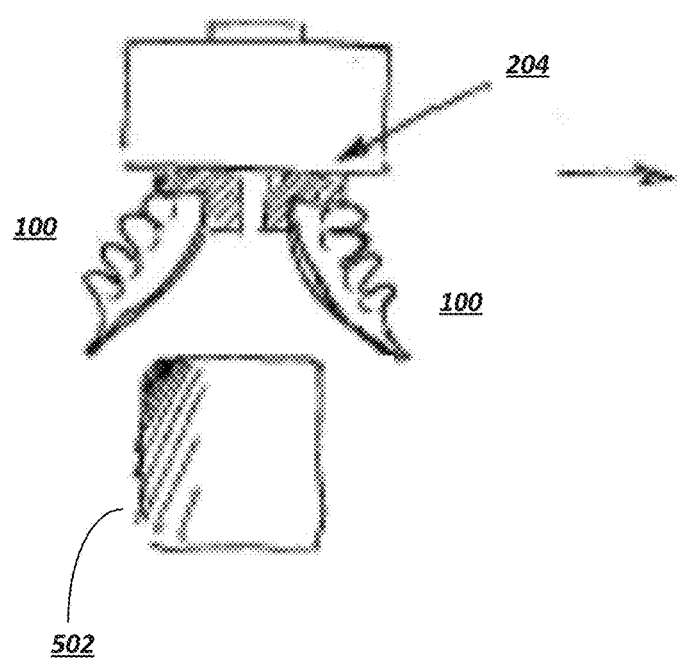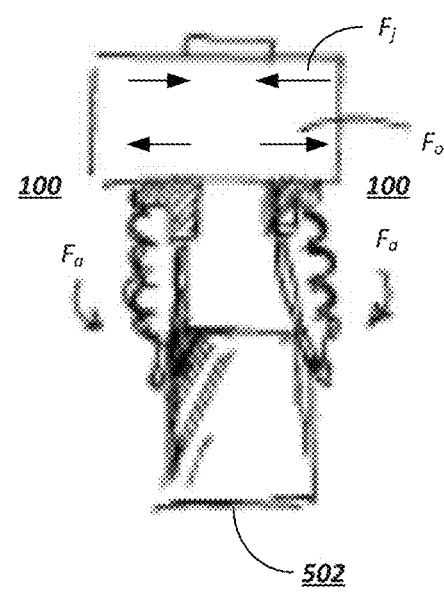
FIG. 5A                                    FIG. 5B

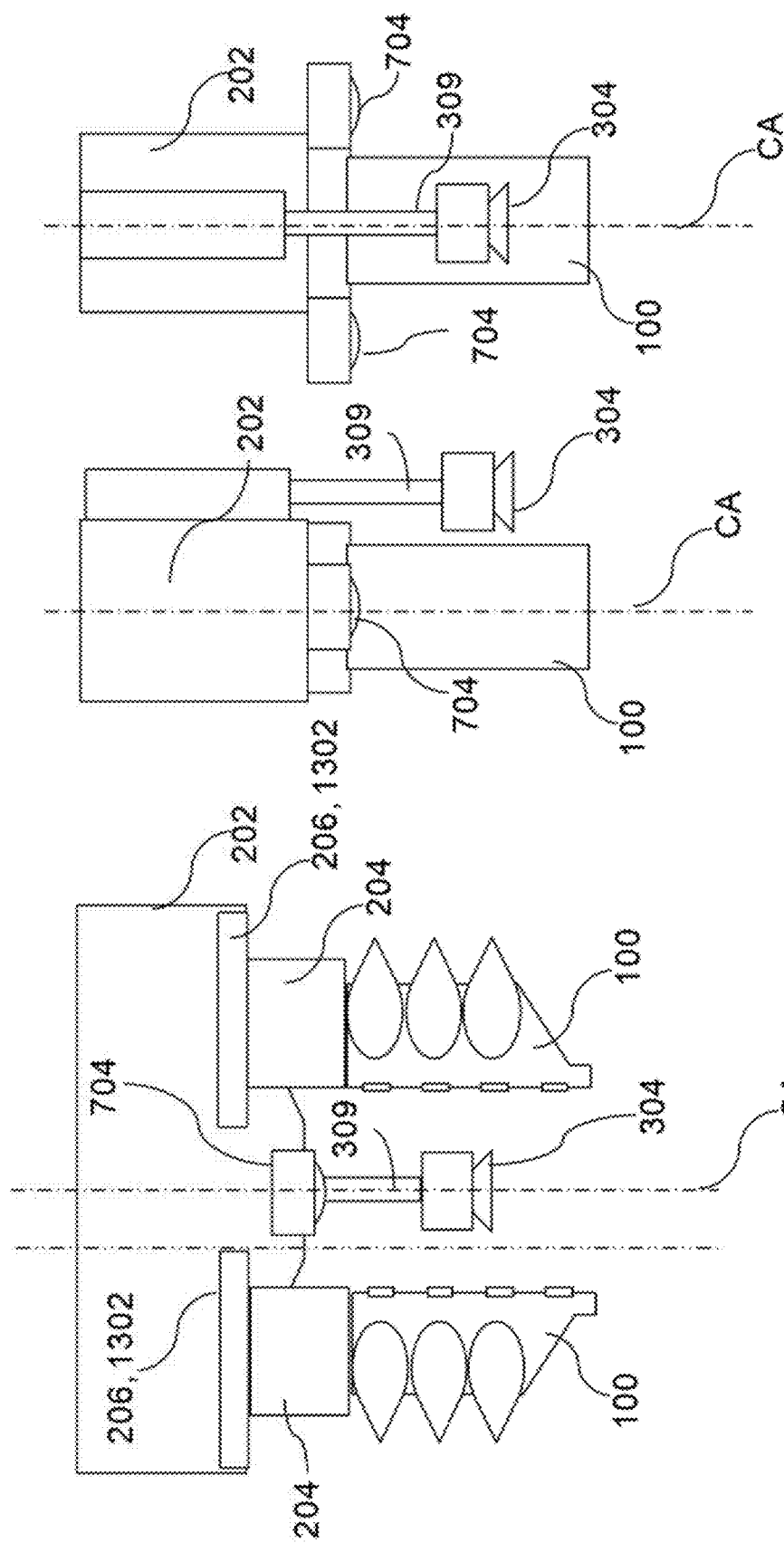

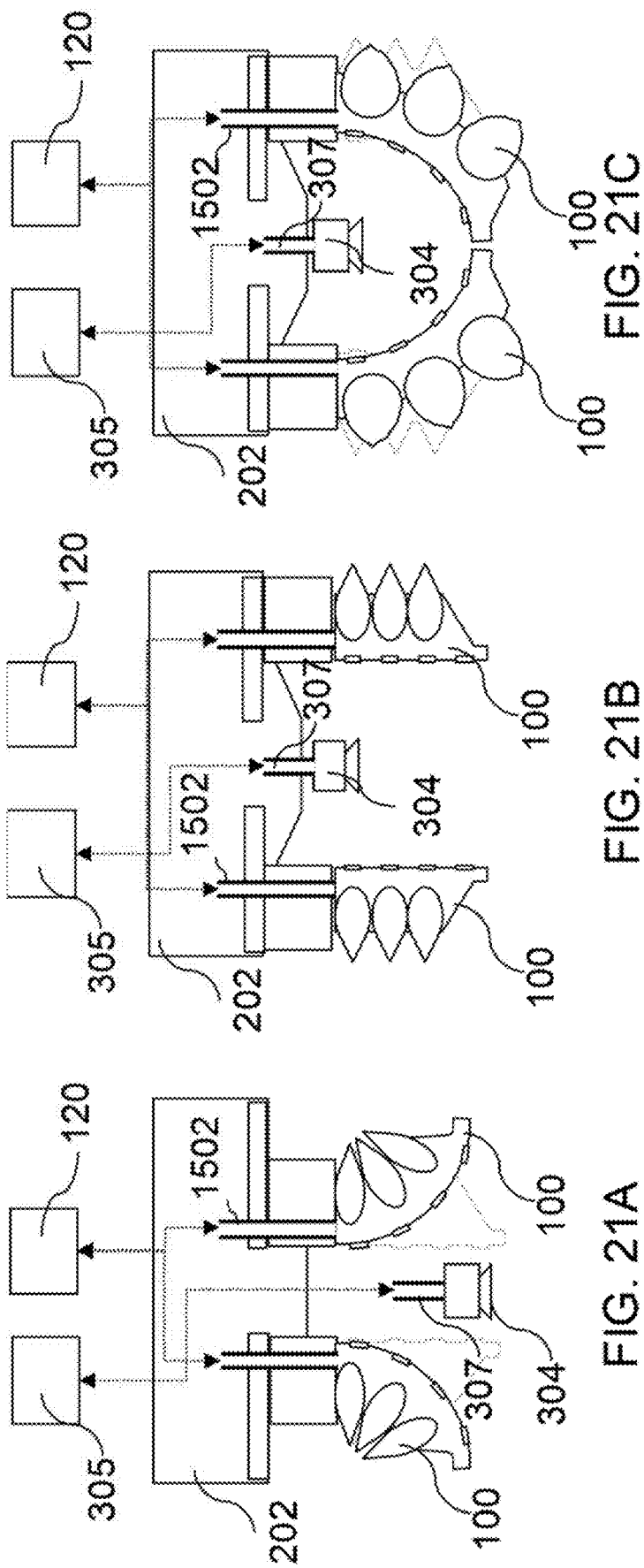

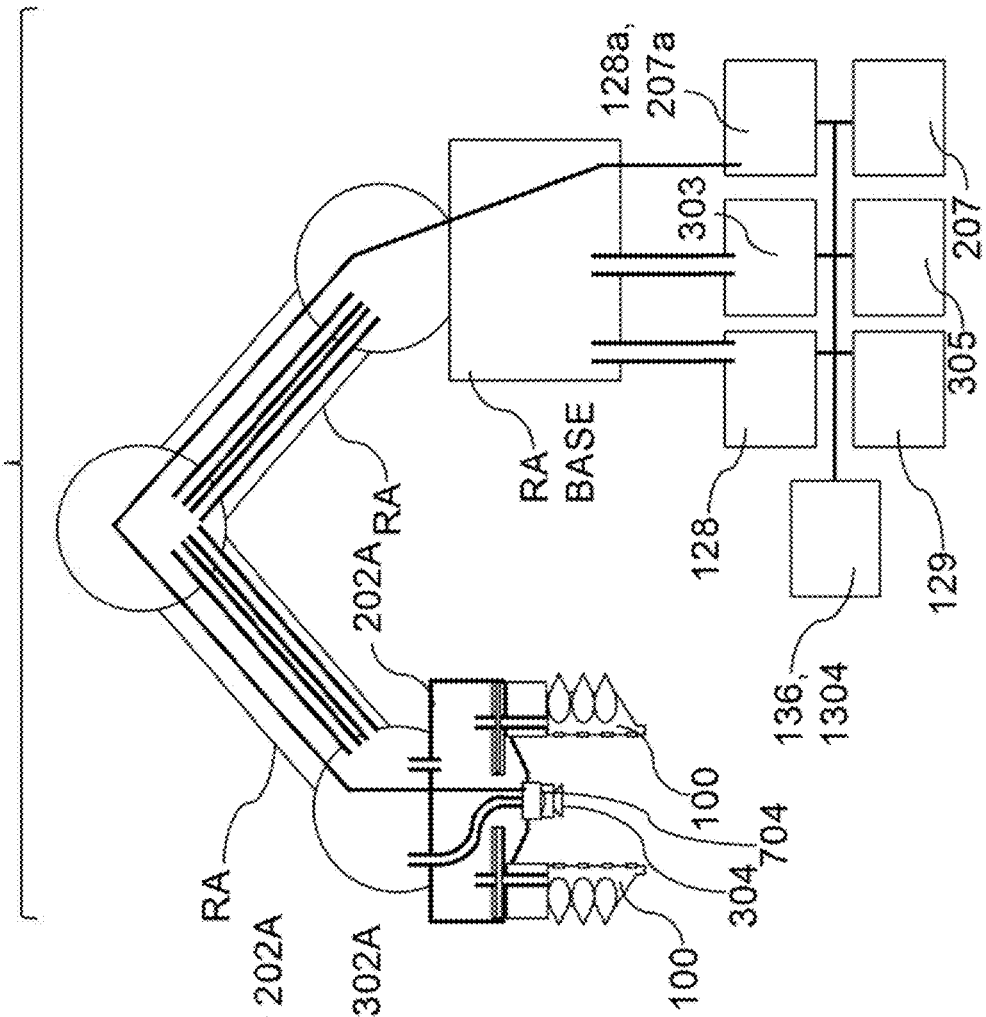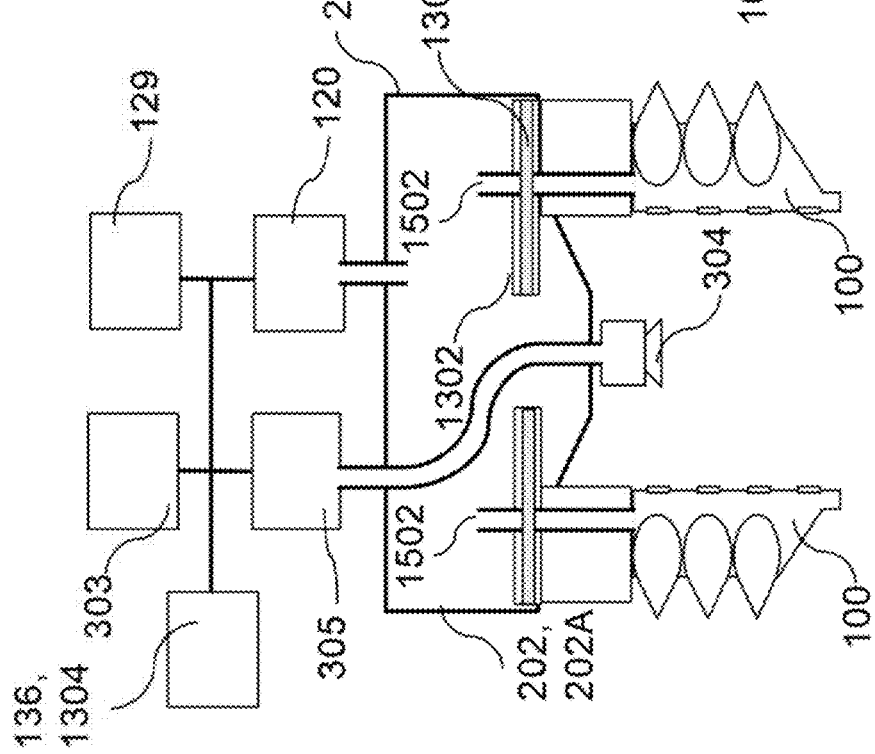

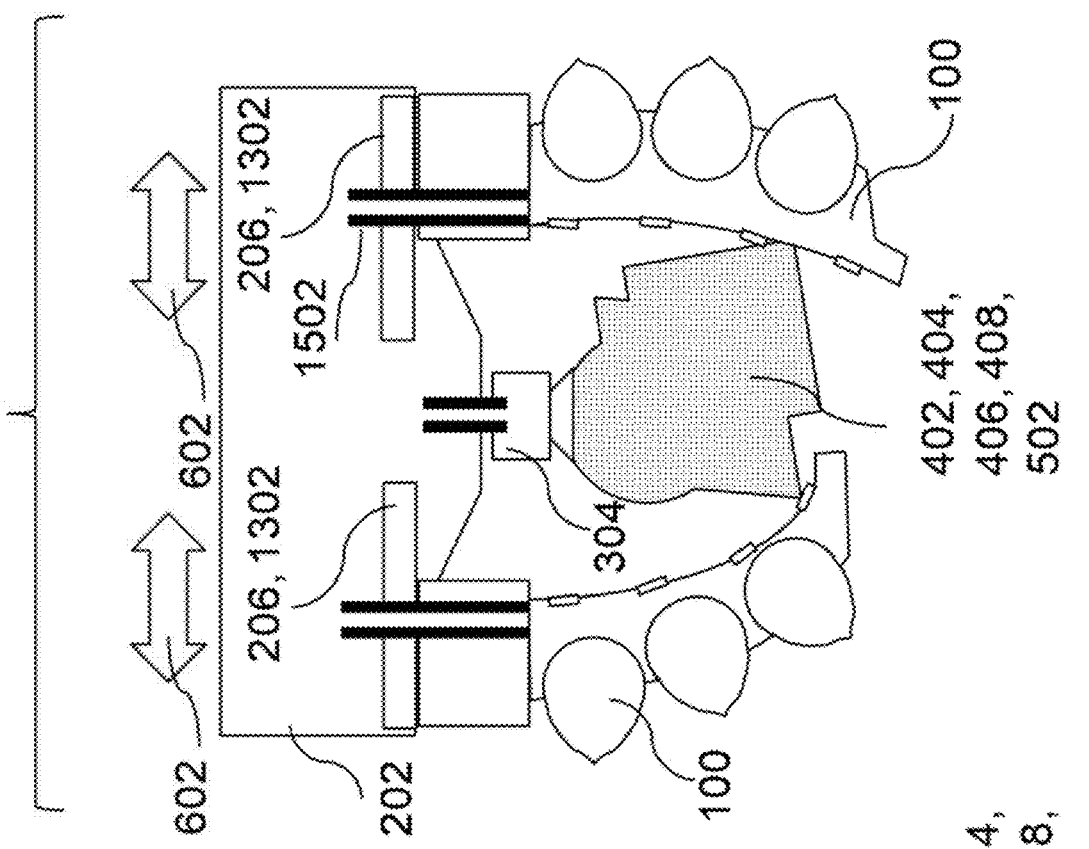
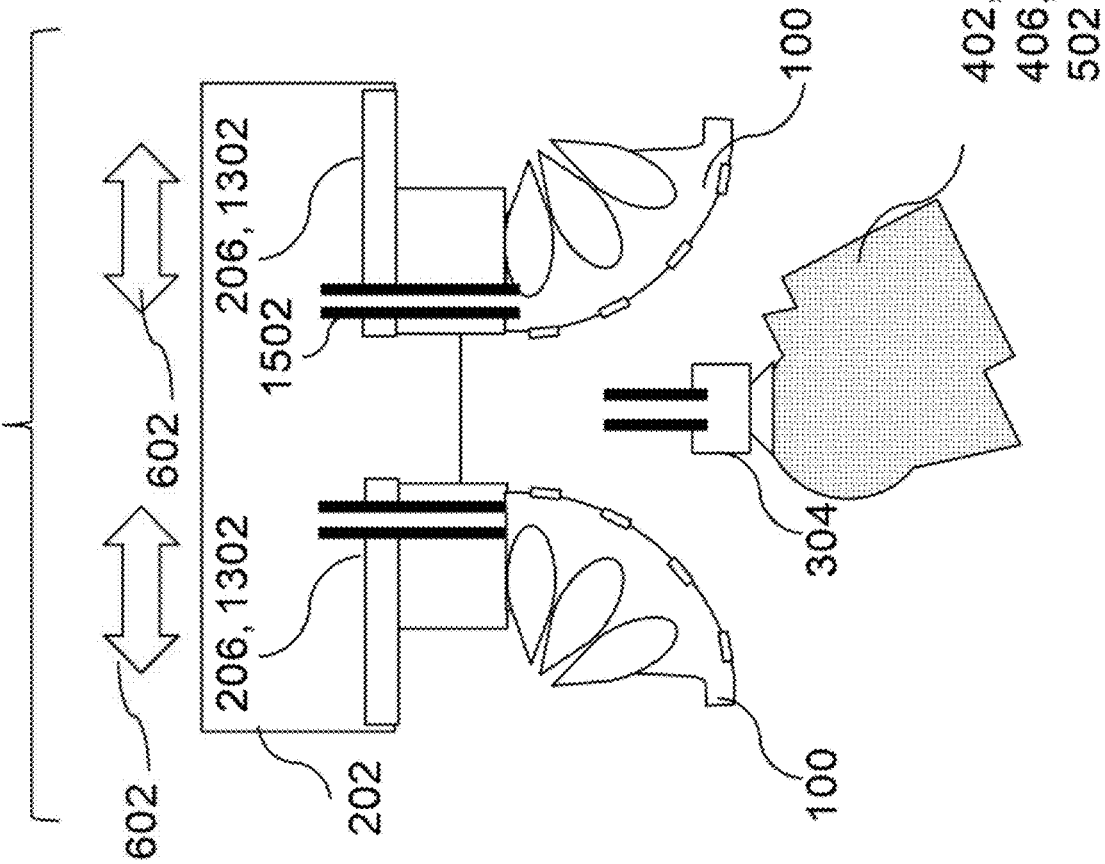

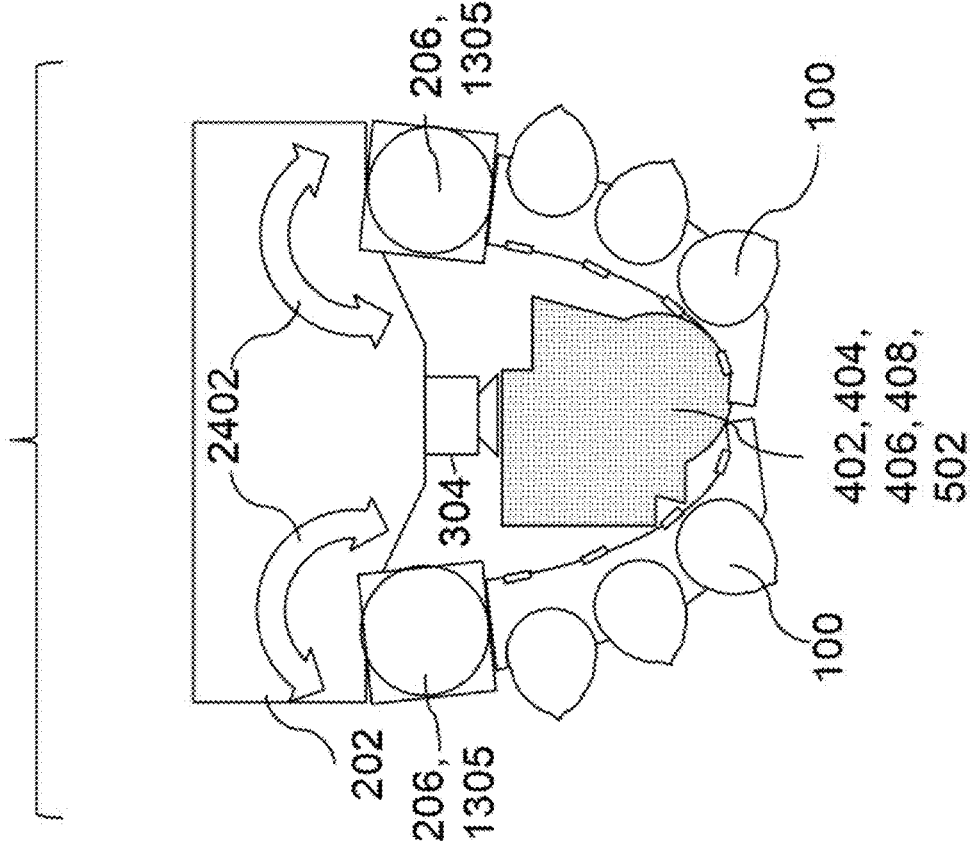
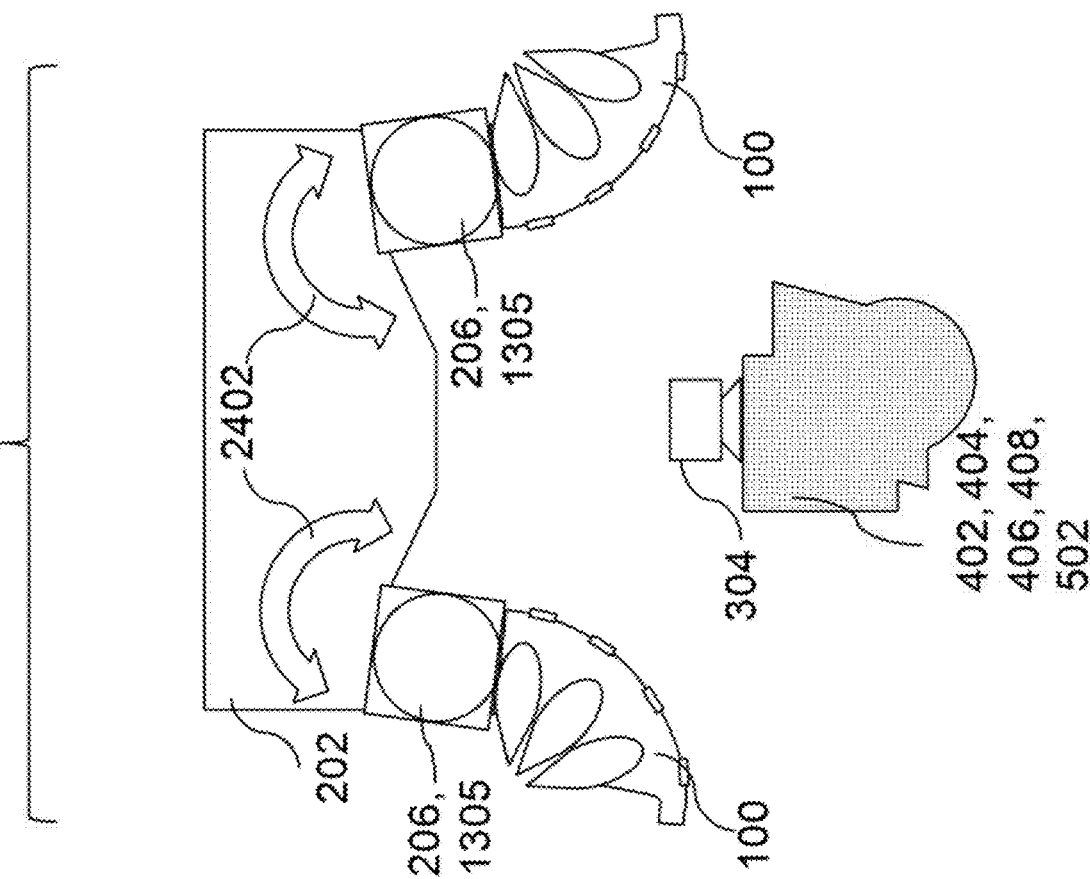

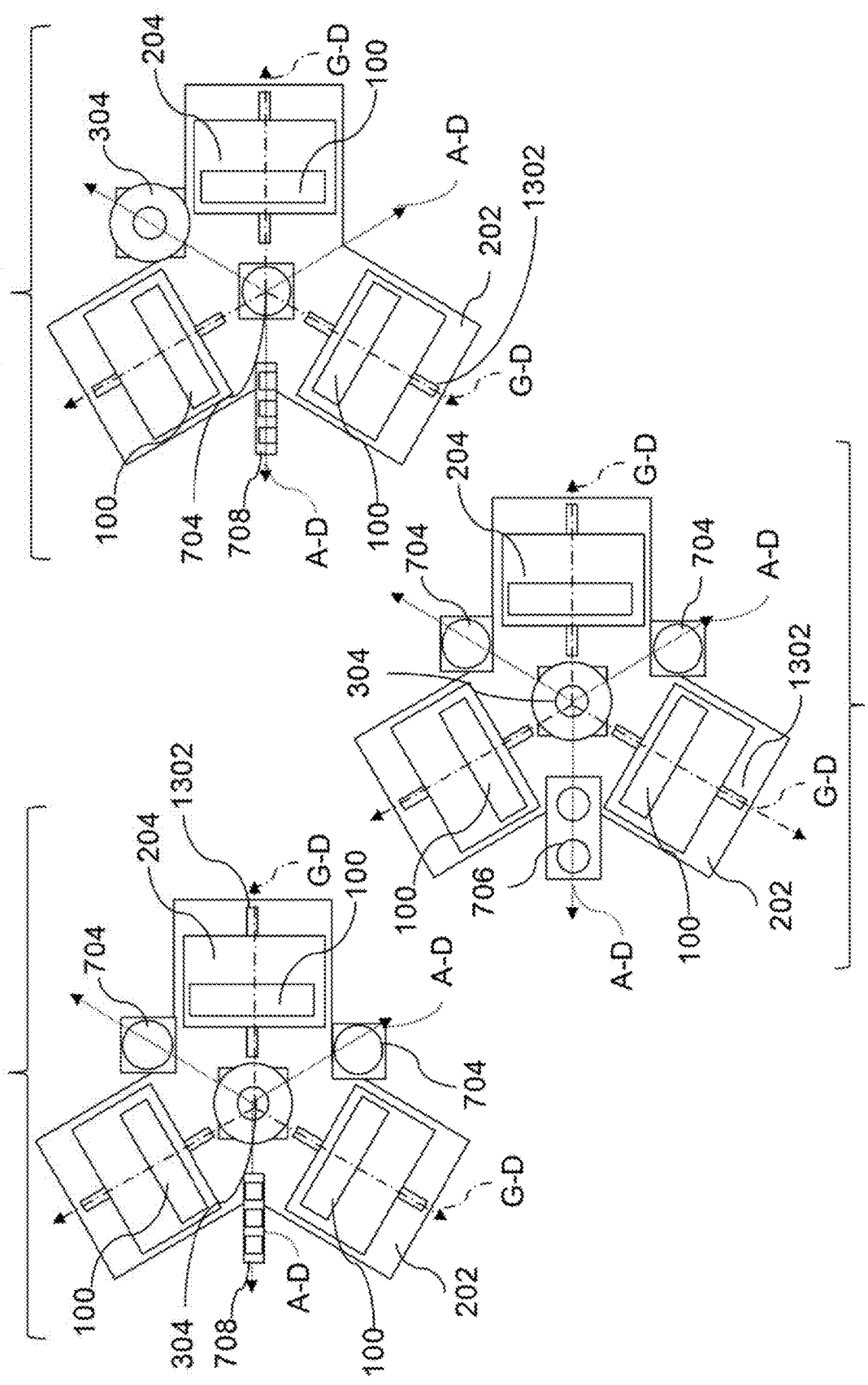

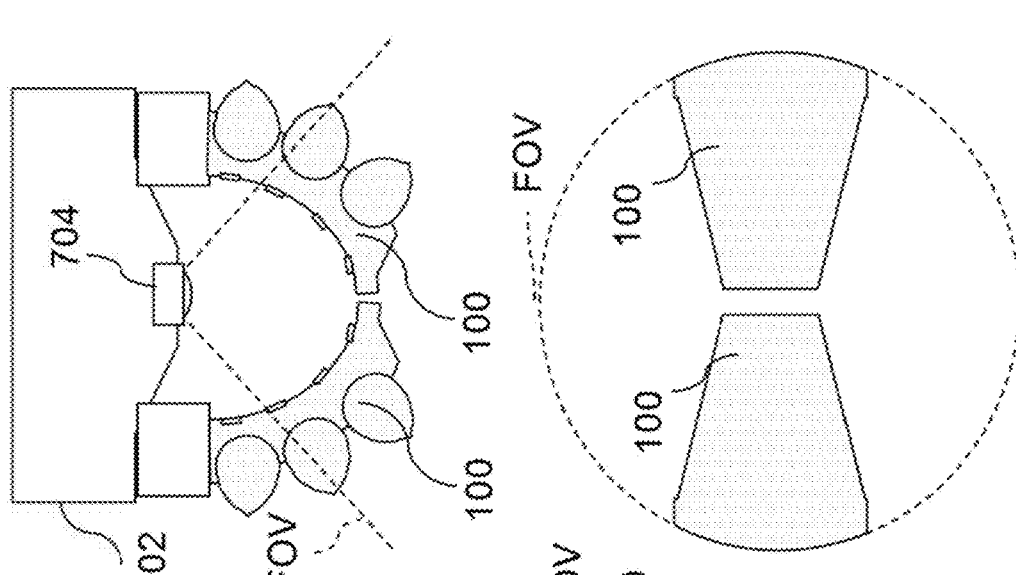
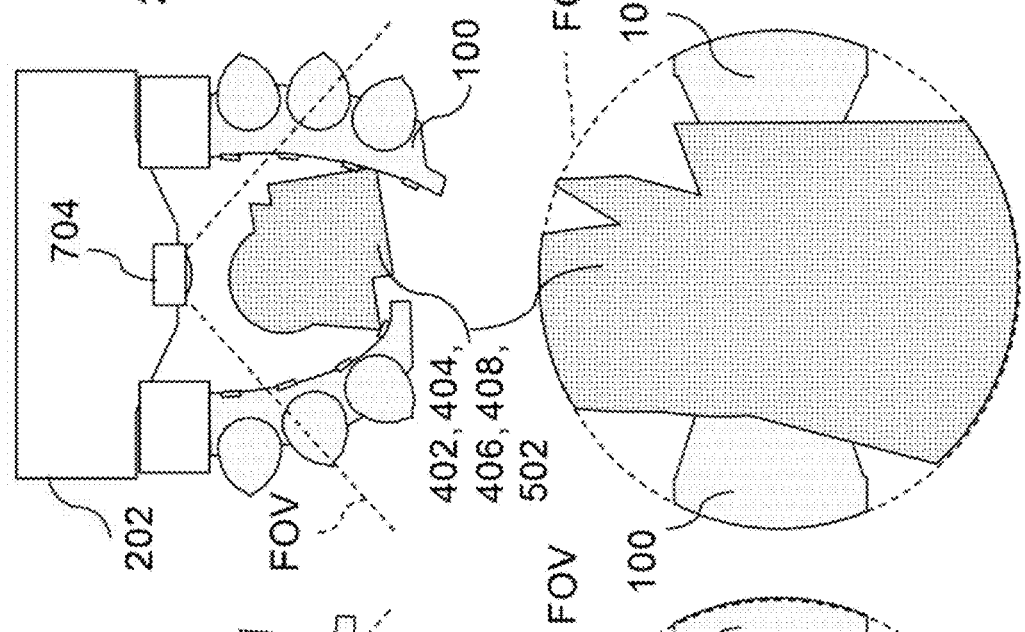
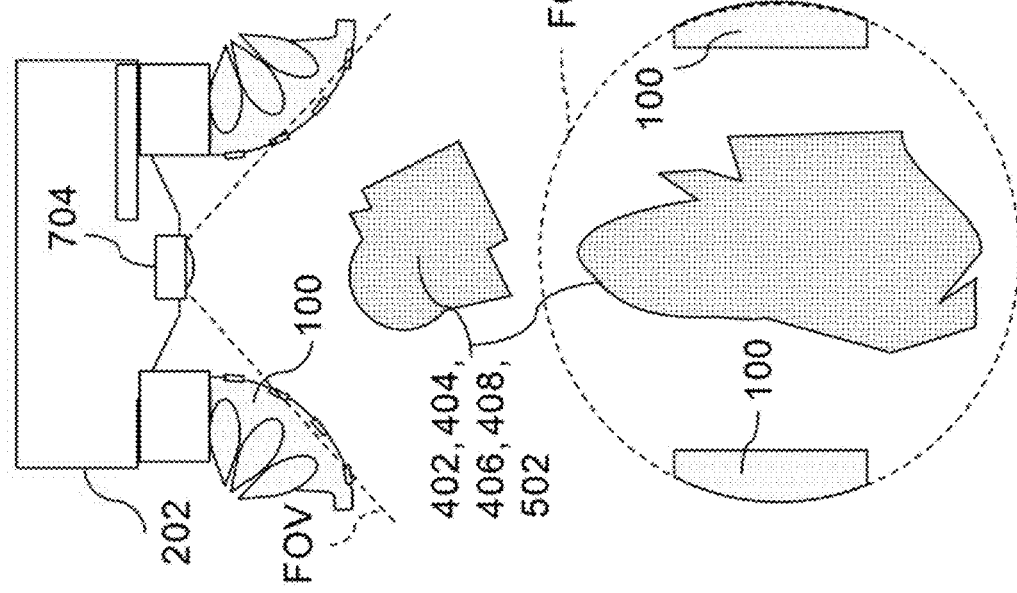

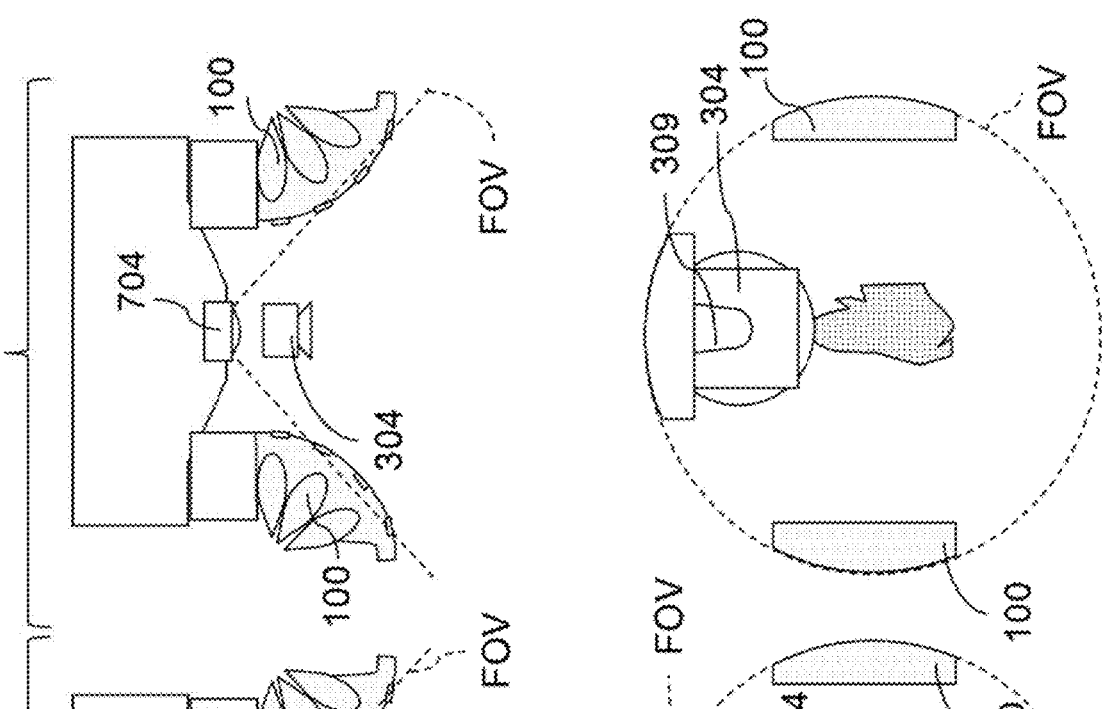

END OF ARM TOOLS FOR SOFT ROBOTIC SYSTEMS

RELATED APPLICATIONS

This application claims priority to U.S. Provisional Patent Application Ser. No. 62/571,916, filed Oct. 13, 2017. This application is also related to and is a Continuation-In-Part of U.S. patent application Ser. No. 15/411,212, filed Jan. 20, 2017, which claims priority to U.S. Provisional Patent Application Ser. No. 62/280,802, filed Jan. 20, 2016. The contents of the aforementioned applications are incorporated herein by reference.

FIELD OF THE DISCLOSURE

The disclosure relates generally to the field of robotics and particularly to novel structures robotic end-of-arm tools.

BACKGROUND

Robotic graspers are increasingly used to automate the retrieval of items from a warehouse. Typically, a warehouse includes many shelves, each containing a number of bins or totes storing items (e.g., items offered for sale). When an order for items is received, the appropriate items are retrieved from the bins or totes and packaged together for shipment.

Due to the size and shape of the totes or bins, the size, weight, and shape of items in the totes or bins, the variability in size, weight, and shape of items in the totes or bins and due to the relatively tight storage constraints in a warehouse or an individual tote or bin, retrieving an item from one of the totes or bins may be difficult for conventional robotic systems. Often, robotic arms include bulky components, or systems extending laterally from the body of the robotic arm, which make it difficult to navigate confined spaces.

SUMMARY

According to one aspect of an embodiment of the present invention, a soft robotic grasping system for grasping an article includes a gripper hub and a finger actuator that applies a first pressure change. A plurality of soft robotic fingers each include an elastomeric outer surface surrounding an internal void, and each is configured to curl in a first degree of freedom when the finger actuator applies the pressure change within the internal voids. Linkages respectively connect each soft robotic finger to the hub, and each is configured to guide in a second degree of freedom to change a pose of the connected soft robotic finger relative to the hub. Linkage actuators are configured to cause the linkages to move, each respectively connected to one of the linkages. Fluid passage tubes provide fluid to the soft robotic fingers, each formed to move according to the linkages when the linkages are caused to move, and configured to provide the pressure change to the internal voids in any position reached by the plurality of soft robotic fingers according the first and second degrees of freedom.

Optionally, linkage fluid seals are formed about the linkages, permitting the linkages to move while sealing fluid flow to the fluid passage tubes. Further optionally, a fluid seal about the hub retains interior fluid pressure. The finger actuator applies the pressure change to the interior of the hub, and the pressure change is transmitted via the linkage fluid seals and fluid passage tubes to the soft robotic fingers. Alternatively, or in addition, the system includes a suction actuator that applies a second pressure change, and a suction cup configured to apply a suction force according to the second pressure change. In this case, an extension linkage connects the suction cup and the hub, and is configured to extend and retract to change a pose of the suction cup to the hub. Optionally, a controller is configured to activate the suction cup and extension actuator to cause the suction cup to contact the article, lift the article by the suction force, and retract the article toward the hub. The controller may activate the finger actuator to cause the soft robotic fingers to curl to apply a grasping force to the article.

According to another aspect of an embodiment of the present invention, a soft robotic grasping system includes a gripper hub and a finger actuator that applies a pressure change. One or more soft robotic fingers includes an elastomeric outer surface surrounding an internal void, each one configured to curl when the finger actuator applies the pressure change within the internal void. Linkages connect each soft robotic finger to the hub, each configured to move in a first degree of freedom to change a pose of the connected soft robotic finger relative to the hub. A linkage actuator causes the linkage to move, the one or more soft robotic fingers moving to grasp according to the combined curling and first degree of freedom. The first degree of freedom may be one of translation or rotation. Alternatively, or in addition, an astrictive effector applies an astrictive force and an extension linkage connects the astrictive effector and the hub, and is configured to extend and retract to change a pose of the astrictive effector relative to the hub.

In one variation, the first degree of freedom applies a clamping force, and the curling applies a grasping force. A controller may be connected to each of the astrictive effector, the finger actuator and the linkage actuator, to activate the astrictive force, the clamping force, and the grasping force in a predetermined order. Alternatively, the controller may be configured to maintain the grasping force and clamping force in a predetermined relationship to one another.

According to one aspect of an embodiment of the present invention, a soft robotic grasping system includes a gripper hub and a finger actuator that applies a pressure change. Soft robotic fingers are supported by the hub, including an elastomeric outer surface surrounding an internal void, and configured to curl when the finger actuator applies the pressure change within the internal void. A camera has a field of view (and, e.g. focus) configured to observe the soft robotic fingers in any of an ungrasped, article grasping, and empty grasping state. A controller connected to the camera and the finger actuator may compare an observation of the soft robotic fingers to a reference state to determine an ungrasped, article grasping or empty grasping state of the soft robotic fingers. The controller may further instruct the finger actuator to apply pressure to change from an empty grasping state to an ungrasped state after the empty grasping state is determined.

Optionally, the gripper hub may have an axial center region about an axial center line, and the camera may be positioned in the axial center region, configured to direct the optical axis of the camera along the axial center line. Alternatively, or in addition, an astrictive effector may be configured to apply an astrictive force. An extension linkage may connect the astrictive effector and the hub, configured to extend and retract the astrictive effector along a direction perpendicular to the grasping direction. The controller may compare an observation of the soft robotic fingers and/or extension linkage to at least one reference state to determine whether the article is successfully grasped.

Optionally, one or more linkages connecting each soft robotic finger to the hub, each changing a pose of the connected soft robotic finger relative to the hub. In this case, the camera's a field of view and focus may be configured to observe the soft robotic fingers in a plurality of poses of the connected soft robotic finger relative to the hub. Further optionally, the reference state may include a predetermined proportion of the field of view corresponding to a recognized characteristic (e.g., color, area) of the soft robotic fingers in the empty grasping state.

According to another aspect of an embodiment of the present invention, a soft robotic grasping system for grasping an article may include a gripper hub, a finger actuator that applies a pressure change, and soft robotic fingers, each arranged along a grasping direction and including an elastomeric outer surface surrounding an internal void. Each soft robotic finger may be configured to curl in a first degree of freedom along the grasping direction when the finger actuator applies the pressure change within the internal void. An astrictive effector may apply an astrictive force, and an extension linkage may connect the astrictive effector and the hub. The extension linkage may extend and retract the astrictive effector along a direction perpendicular to the grasping direction. A camera may have a field of view and focus configured to observe the soft robotic fingers in any of an ungrasped, article grasping, and empty grasping state and the extension linkage in unextended and extended states. A controller connected to the camera may be configured to compare an observation of the soft robotic fingers and/or extension linkage to at least one reference state to determine whether the article is successfully grasped (and/or successfully picked up by the astrictive effector).

Optionally, the gripper hub has an axial center region about an axial center line, and the camera is positioned in the axial center region and is configured to direct the optical axis along the axial center line. In this case, the astrictive effector and extension linkage may be positioned adjacent the axial center region and configured to direct the extension of the astrictive effector parallel to the axial center line. Further optionally, linkages may respectively connecting the soft robotic fingers to the hub, each changing a pose of the connected soft robotic finger relative to the hub, and linkage actuators may be configured to cause the linkages to move, each linkage actuator respectively connected to one of the linkages, According to a further aspect of an embodiment of the present invention, a soft robotic grasping system may include a gripper hub having an axial center region about an axial center line. A plurality of grasping directions may be defined radially symmetric about the axial center line, and a plurality of accessory directions may be defined between adjacent grasping directions. A finger actuator may apply a pressure change, and soft robotic fingers, may be arranged along a grasping direction. Each finger may include an elastomeric outer surface surrounding an internal void, and may curl in a first degree of freedom along the grasping direction when the finger actuator applies the pressure change within the internal void. A first accessory may act along the axial center line being positioned in the axial center region. A second accessory may act parallel to the axial center line. The second accessory may be positioned along an accessory direction adjacent the axial center region. The first and second accessories may be selected from a vacuum chuck extendible in a direction parallel to the axial center line, a camera having an optical axis extending in a direction parallel to the axial center line, and a range finder having a ranging axis extending in a direction parallel to the axial center line. An illuminator illuminating the field of view may also be one of the first and second accessories.

Optionally, the camera may be positioned in the axial center region and configured to direct the optical axis along the axial center line. In this case, the vacuum chuck may be positioned adjacent the axial center region and configured to extend in the direction parallel to the axial center line. Alternatively, or in addition, linkages may respectively connect soft robotic fingers to the hub, each configured to change a pose of the connected soft robotic finger along the grasping direction. Further optionally, linkage actuators may cause the linkages to move, each linkage actuator respectively connected to one of the linkages.

According to an additional aspect of an embodiment of the present invention, a soft robotic grasping system for grasping an article may include a gripper hub having robotic fingers. Each soft robotic finger may include an elastomeric outer surface surrounding an internal void, and may curl in a first degree of freedom when the finger actuator applies the pressure change within the internal voids. Linkages may respectively connect each soft robotic finger to the hub, each configured to guide in a second degree of freedom to change a pose of the connected soft robotic finger relative to the hub. Linkage actuators may cause the linkages to move, each respectively connected to one of the linkages. A camera having a field of view may be configured to observe the soft robotic fingers in any of an ungrasped, article grasping, and empty grasping state. A controller connected to the camera may be configured to compare an observation of the soft robotic fingers to at least one reference state to determine whether the article is successfully grasped.

Optionally, an astrictive effector may be configured to apply an astrictive force, and an extension linkage may connect the astrictive effector and the hub, configured to extend and retract the astrictive effector along a direction perpendicular to the grasping direction. The camera may be further configured to observe the extension linkage in unextended and extended states, and a controller connected to the camera may be configured to compare an observation of the extension linkage to at least one reference state. Further optionally, one or more reference states may include a predetermined proportion of the field of view corresponding to a recognized characteristic of the soft robotic fingers in at least one of the ungrasped, article grasping, and empty grasping state.

According to still another aspect of an embodiment of the present invention, a soft robotic grasping system for grasping an article may include a finger actuator that applies a pressure change, and soft robotic fingers, each including an elastomeric outer surface surrounding an internal void. Each soft robotic finger may be configured to curl in a first degree of freedom when the finger actuator applies the pressure change within the internal voids. Linkages may respectively connect each soft robotic finger to the hub, and may be configured to guide the connected soft robotic finger in a second degree of freedom to change a pose of the connected soft robotic finger relative to the hub. Grip pads may be respectively connected to a translating member of each linkage, each configured to apply a clamping force when the translating member is moved. Linkage actuators may cause the linkages to move, each respectively connected to one of the linkages. A controller may be configured to, in a first mode, activate the linkage actuators to cause the translating members of the linkages to move to apply the clamping force to a first article, and in a second mode, activate the finger actuator to cause the soft robotic fingers to curl to apply a grasping force to a second article.

Optionally, the controller may be further configured, in a third mode, to activate the finger actuator to cause the soft robotic fingers to curl to apply the grasping force to the second article and to activate the linkage actuators to cause the translating members of the linkages to move to apply a portion of the clamping force via the soft robotic fingers to the same second article. Further optionally, the controller may be configured in the third mode to successively actuate one of the linkage actuators or the finger actuators, then actuate the remaining one of the linkage actuators or the finger actuators to combine the portion of the clamping force and the grasping force. Still further, the controller may be further configured in the third mode to simultaneously actuate the linkage actuators and the finger actuators to combine the portion of the clamping force and the grasping force. Still yet further, the controller may be configured in the third mode to maintain the grasping force and clamping force in a predetermined relationship to one another.

According to still yet another aspect of an embodiment of the present invention, a soft robotic grasping system for grasping an article may include a finger actuator that applies a pressure change, and soft robotic fingers, each including an elastomeric outer surface surrounding an internal void. Each soft robotic finger may be configured to curl in a first degree of freedom when the finger actuator applies the pressure change within the internal voids. Linkages, each respectively connecting a soft robotic finger to the hub, may be configured to guide the connected soft robotic finger in a second degree of freedom to change a pose of the connected soft robotic finger relative to the hub. Grip pads, each respectively connected to a translating member of a linkage, may be configured to apply a clamping force when the translating member is moved. Linkage actuators may cause the linkages to move, each linkage actuator respectively connected to one of the linkages. A controller may activate the linkage actuators to cause the translating members of the linkages to move to apply the clamping force to an article, and may activate the finger actuators to cause the soft robotic fingers to curl to apply a grasping force to the article. The controller may be configured to, in a first mode, successively actuate one of the linkage actuators or the finger actuators then the remaining one of the linkage actuators or the finger actuators to combine the clamping force and the grasping force, and in a second mode, simultaneously actuate the linkage actuators and the finger actuators to combine the clamping force and the grasping force.

Optionally, the controller is further configured to maintain the grasping force and clamping force in a predetermined relationship to one another. Further optionally, a suction cup may be configured to apply a vacuum force to the article, the suction cup being mounted to the extension actuator and configured to move toward or away from the hub. The suction cup may create a vacuum force when the suction cup actuator applies the second pressure change, and the controller may be further configured to, in a third mode, activate the suction cup actuator and extension actuator to cause the suction cup to contact the article, lift the article by the vacuum force, and retract the article toward the hub. The controller may alternatively or in addition be further configured to complete the third mode before the first or second mode. Further, the linkages may move to apply a portion of the clamping force and the grasping force via the soft robotic fingers to a same article.

According to yet another aspect of an embodiment of the present invention, a soft robotic grasping system for grasping an article may include a gripper hub and a finger actuator that applies a first pressure change. A suction cup actuator may apply a second pressure change An extension actuator may extend away from or retracts toward the hub, and soft robotic fingers, may each including an elastomeric outer surface surrounding an internal void. Each soft robotic finger may be configured to curl in a first degree of freedom when the finger actuator applies the pressure change within the internal voids. A suction cup may be configured to apply a vacuum force to the article. The suction cup may be mounted to the extension actuator and configured to move toward or away from the hub, and may create a vacuum force when the suction cup actuator applies the second pressure change. A controller may be configured to, in a first mode, activate the suction cup actuator and extension actuator to cause the suction cup to contact the article, lift the article by the vacuum force, and retract the article toward the hub, and in a second mode, activate the finger actuator to cause the soft robotic fingers to curl to apply a grasping force to the article.

Optionally, the controller is further configured to, in a third mode, complete the first mode before the second mode. Further optionally, the controller is configured to, in a fourth mode, start the second mode before the first mode completely retracts the article toward the hub. The systems may alternatively, or in addition, include a camera having a field of view configured to observe the soft robotic fingers in any of an ungrasped, article grasping, and empty grasping state. The controller may be configured to compare an observation of the soft robotic fingers to a reference state to determine an ungrasped, article grasping or empty grasping state of the soft robotic fingers. The field of view of the camera may be further configured to observe the suction cup in retracted and extended states of the extension actuator. The controller may be further configured to compare an observation of the suction cup to one or more one reference states to determine whether the article is successfully lifted.

BRIEF DESCRIPTION OF THE DRAWINGS

FIGS. 1A-1G depict various examples of soft robotic actuators.

FIGS. 5A-5B depict an exemplary technique for controlling an EOAT to provide a self-optimizing gripping force.

FIGS. 20A-20C are schematic front and side views of a gripper hub showing different locations for a suction cup and camera upon an EOAT.

FIGS. 21A-21C are schematic side views of a gripper hub showing fluid routing and movable fluid passage tubes for an EOAT.

FIGS. 22A and 22B are schematic side views of a gripper hub system and gripper hub system including a robot arm, respectively, and showing fluid and electrical control connections and routing, including a controller.

FIGS. 23A and 23B are schematic side views of a gripper hub system and article to be gripped, showing differing translation positions of soft robotic fingers as well as different curling positions of soft robotic fingers and extension positions of a vacuum cup.

FIGS. 24A and 24B are schematic side views of a gripper hub system and article to be gripped, showing differing rotation positions of soft robotic fingers as well as different curling positions of soft robotic fingers and extension positions of a vacuum cup.

FIGS. 26A through 26C are schematic bottom views of a differing arrangements of sensors and actuators along a gripping direction and accessory direction, for a trilaterally symmetric gripper hub.

FIGS. 27A through 27C are schematic side views of a gripper hub system and article to be gripped in different states of gripping and observation, together with corresponding fields of view of a camera on the gripper hub.

FIGS. 28A through 28C are schematic side views of a gripper hub system and article to be lifted in different states of suction lifting and observation, together with corresponding fields of view of a camera on the gripper hub.

DETAILED DESCRIPTION OF THE PREFERRED EMBODIMENTS

Figure 1A:
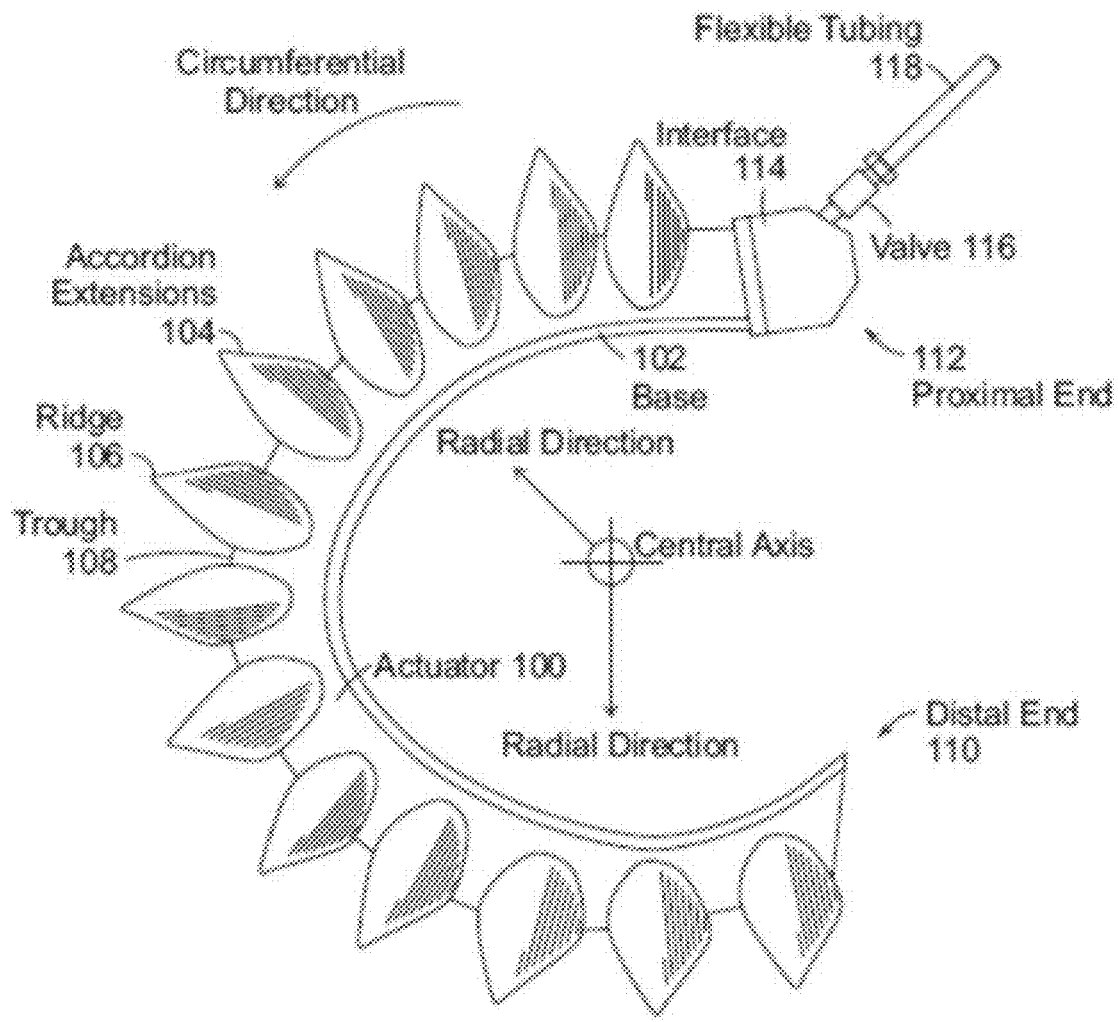

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, coated fabric, or thin walls of plastic arranged in an accordion structure that is configured to unfold, stretch, twist, bend, extend and/or contract under pressure, or other suitable relatively soft materials. As an alternative or in addition to accordion structures, other types or configurations of soft actuators employing elastomeric materials may be utilized. They may be created, for example, by molding or bonding one or more pieces of the elastomeric material into a desired shape. Alternatively or in addition, different pieces of elastomeric material may be thermally bonded, or sewn. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Figure 1B:
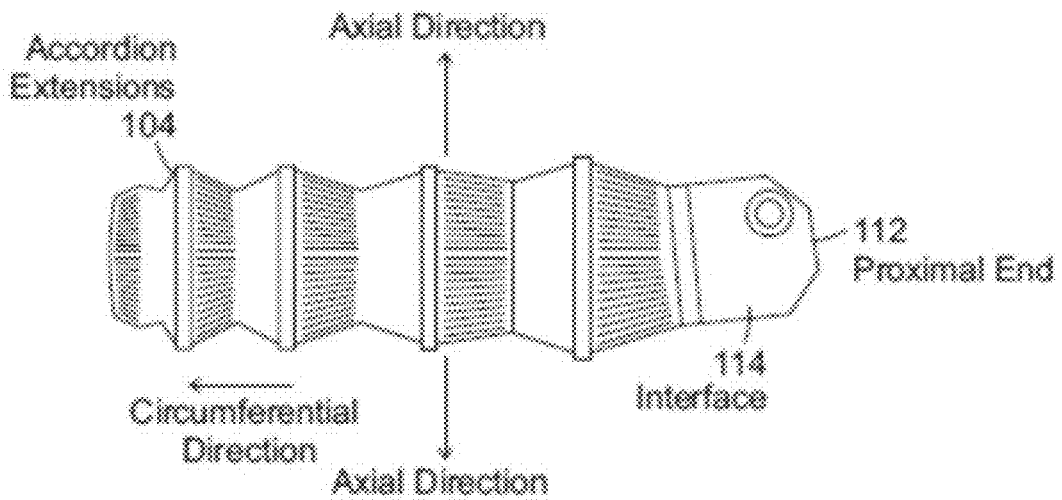
Figure 1C:
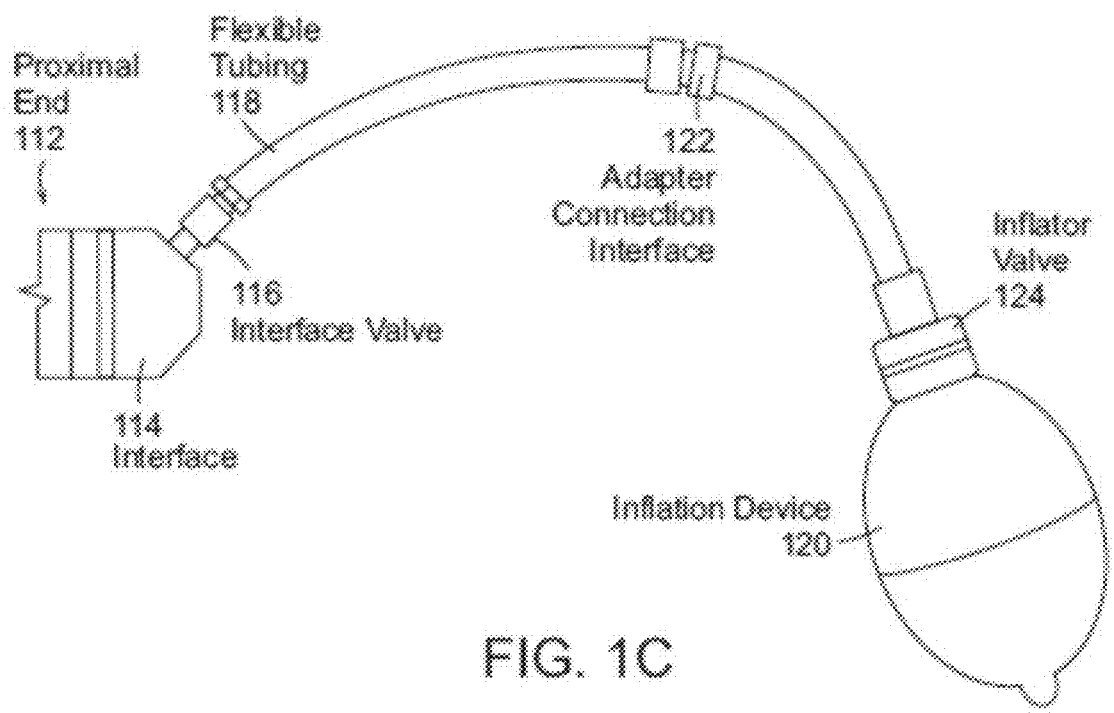
Figure 1D:
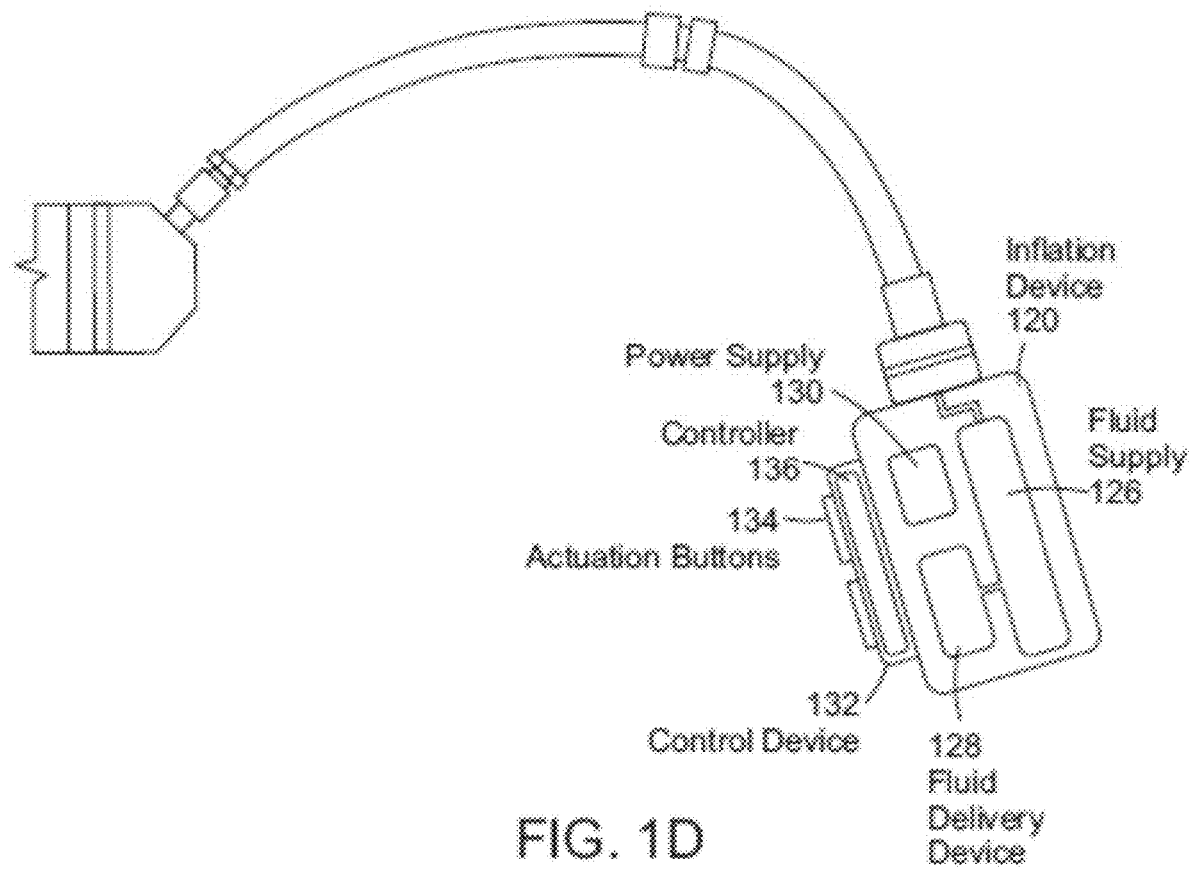

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, saline, or any suitable liquid, gas, gel, foam, etc. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated or deflated, and help to define the shape of the actuator 100 when in an inflated or deflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts. The interface 114 may be made of a food- or medically-safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118.

The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch, an interface, a touch display, etc.). The control device 132 may include a controller 136 for sending a control signal to the fluid delivery device 128 to cause the fluid delivery device 128 to supply inflation fluid to, or withdraw inflation fluid from, the actuator 100.

Soft robotic actuators may be useful in many instances where a hard actuator is undesirable. For example, and without limitation, a soft actuator may pick up a packaging blank or preform and provide it to a blow molder, after which the blow molder may reshape the blank into the desired form based on the mold. After being shaped, the molded part will typically be quite hot and deformable. The molded part may be retrieved by the soft actuator without damaging or deforming the molded part. The actuator may then hold the molded part while it is being washed, labeled, filled, and/or capped. Other soft actuators may hold live animals gently, such as for inoculation, analysis or surgery.

One problem in conventional blow molding operations is that the object being grasped has a different shape before and after blow molding (transitioning from the packaging blank to the finally-formed product. Whereas a hard gripper may have difficulty adapting to the changing shape (thus perhaps requiring two different types of grippers for a single blow molding operation, a soft actuator may be sufficiently adaptable to grasp both object shapes using the same gripper.

Soft robotic actuators may be inflated with a predetermined amount of inflation fluid (or to a predetermined pressure), and the inflow/outflow of the actuators and/or the internal pressure of the actuator may be measured. Upon making contact with an object, the actuator may be deflected and, as a result, inflation fluid may flow out of (or into) the actuator. This flow of inflation fluid may serve as a detector that indicates the presence of an object at a position or generally in contact with the actuator. Alternatively, the actuator may include touch sensors, bending sensors, or other types of detection devices for registering contact with an object.

FIG. 1E depicts a soft robotic actuator 100 with multiple fingers, in which the gripper hub 202 is attached to a robot arm RA, in which the fluid supply for actuation is provided via an external fluid line 118. The fingers 100 are shown in a reverse curled position and curled in the direction 604.

Figure 1F:
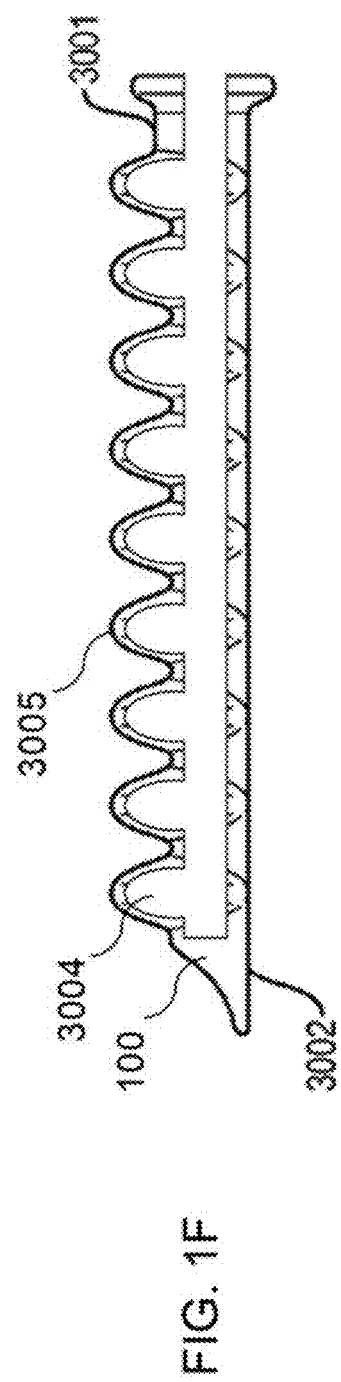
Figure 1G:
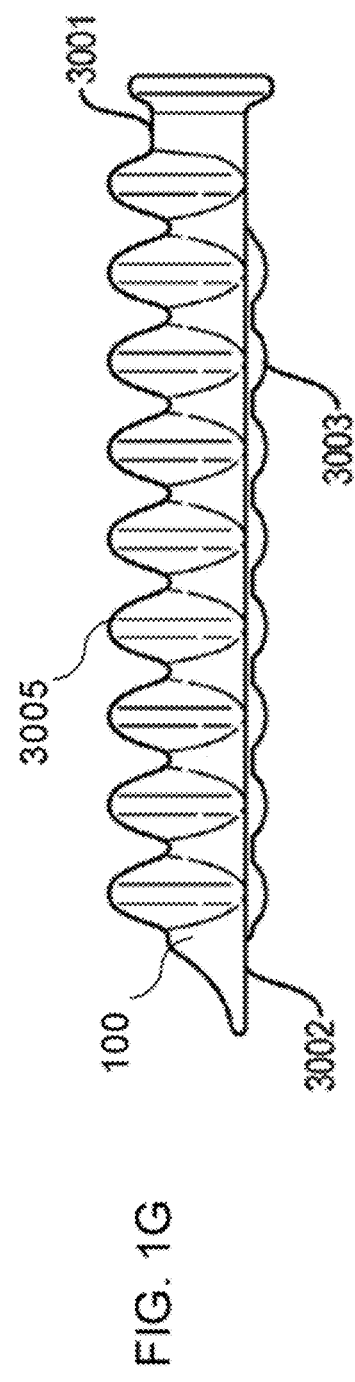

FIGS. 1F and 1G depict a soft robotic actuator finger 100 that may be used with any embodiment discussed herein. Each finger 100 or actuator 100 includes an elastomeric outer surface 3005 surrounding an internal void 3004, and the is configured to curl when an inflation fluid is supplied to the internal void 3004. A strain-limiting side 2003 resists extension while the expanding side 3001 includes bellows features to promote extension as well as contraction upon a change in fluid pressure, either extension or contraction causing curling in one direction or another. Reinforcing ribs 3003 constrain expansion and contraction to occur primarily along the curling direction, and also provide some texture or ridges for grasping.

FIGS. 1A-1G depict a particular type of soft robotic actuator, sometimes referred to as an accordion-type soft actuator. However, numerous other types of soft actuators exist, some of which are described in connection with particular embodiments below. Soft actuators include actuators formed partially or entirely from soft or compliant materials, and may incorporate or surround more conventional hard actuator materials.

Soft actuators may move in a variety of ways. For example, soft actuators may bend, as shown above, or may twist, as in the example of the soft tentacle actuator described in U.S. patent application Ser. No. 14/480,106, entitled "Flexible Robotic Actuators" and filed on Sep. 8, 2014. In another example, soft actuators may be linear actuators, as described in U.S. patent application Ser. No. 14/801,961, entitled "Soft Actuators and Soft Actuating Devices" and filed on Jul. 17, 2015. Still further, soft actuators may be formed of sheet materials, as in U.S. patent application Ser. No. 14/329,506, entitled "Flexible Robotic Actuators" and filed on Jul. 11, 2014. In yet another example, soft actuators may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014.

One of ordinary skill in the art will recognize that other configurations and designs of soft actuators are also possible and may be employed with exemplary embodiments described herein.

End Effectors

An end effector may be the device at the end of a robotic arm, designed to interact with the environment, and/or may be the last link (or endpoint) of the robot. At an endpoint, tools may be attached; or, the end effector may itself act as a tool. An end effector may include one or both of a gripper or a tool. While grippers tend to hold, lift, transport and/or manipulate objects, tool functions often have a contrasting function, and may change a characteristic of the work object rather than gripping or holding it. Tool functions may include welding or fusing, spraying, dispensing, milling, screw or nut driving, flattening, cutting, and combinations of these.

At least four categories of end effector include impactive (e.g., jaws, claws, grasping a work object by direct impact, including holding friction); ingressive (e.g., penetrating the work object with needles, pins, or hackles); astrictive (e.g., essentially attractive or field forces such as Bernouilli lift, suction force, vacuum force, magnetic, electrostatic, van der Waals', ultrasonic standing waves, laser tweezing), and contigutive (e.g., essentially adhesive forces via capillary action, glue, surface tension, freezing, chemical reaction).

In hard robotics, gripping may performed by using a form-following static shape in the gripping surface (e.g., a concave cup to lift a round object), or by friction force increased by closing hard fingers, jaws or claws. A soft robotic end effector may include gripper functionality, and may also or alternatively include some tool functionality. Soft robotic grippers may be impactive, and may additionally be made ingressive, astrictive, and/or contigutive via a particular gripper/actuation morphology or configuration, or by adding an accessory tool within or along or opposite the soft robotic gripper.

A soft robotic gripper may include one or more soft robotic members, which may take organic prehensile roles of finger, arm, tail, or trunk, depending on the length and actuation approach. In the case of inflating and/or deflating soft robotic members, two or more members may extend from a hub, and the hub may include a manifold for distributing fluid (gas or liquid) to the gripper members and/or a plenum for stabilizing fluid pressure to the manifold and/or gripper members. The members may be arranged like a hand, such that the soft robotic members act, when curled, as digits facing, a "palm" against which objects are held by the digits; and/or the members may also be arranged like an cephalopod, such that the soft robotic members act as arms surrounding an additional central hub actuator (suction, gripping, or the like). Generally, although not exclusively, as used herein, the terms "base plate", "palm plate", "bumper plate", or "hub plate" may refer to a reference surface adjacent two or more soft robotic members against which the soft robotic member may hold a work object, e.g., when curled in a "closing" direction, and from which the grip of the soft robotic members on the work object may be released, e.g., when the soft robotic members are curled or recurled in an "opening" direction. The use of "plate" does not suggest that the member is fully planar—"plates", unless otherwise described, may have surface relief, contour, curves, peaks and valleys, texture, or the like—a "plate", unless otherwise described, describes a member fitting within a plate-like envelope or aspect ratio.

Soft robotic gripper members may be formed of elastomeric materials, such as rubber, and/or thin walls of plastic arranged in an accordion structure that is configured to unfold, stretch, and/or bend under pressure, or other suitable relatively soft materials. Soft robotic gripper members may include a channel and/or hollow interior that can be filled with a fluid, such as air, water, or saline to pressurize, inflate, and/or actuate the gripper member. Upon actuation, the shape or profile of the gripper member changes by, e.g., variably curving, curling, including in opposing directions, or straightening. Alternatively or in addition, the gripper member may be actuated using a vacuum to remove inflation fluid from the gripper member and thereby change the degree to which the gripper member bends, twists, and/or extends.

Actuation may also allow the gripper member(s) to exert a force on a workpiece, such as a workpiece being grasped or pushed, as well as partially or fully conforming to the shape of the workpiece being grasped. Soft robotic gripper members can also harmlessly deflect upon collision with workpieces or the work environment.

Exemplary End-of-Arm-Tools

Exemplary embodiments described herein relate to end-of-arm tools (EOATs) having various adjustable components that allow them to grasp targets of different sizes, shapes, or properties. Some embodiments incorporate dual gripping modes, in which a target may be grasped (using the same EOAT) by a hard actuator or a soft actuator, depending on the particular application.

Figure 2:
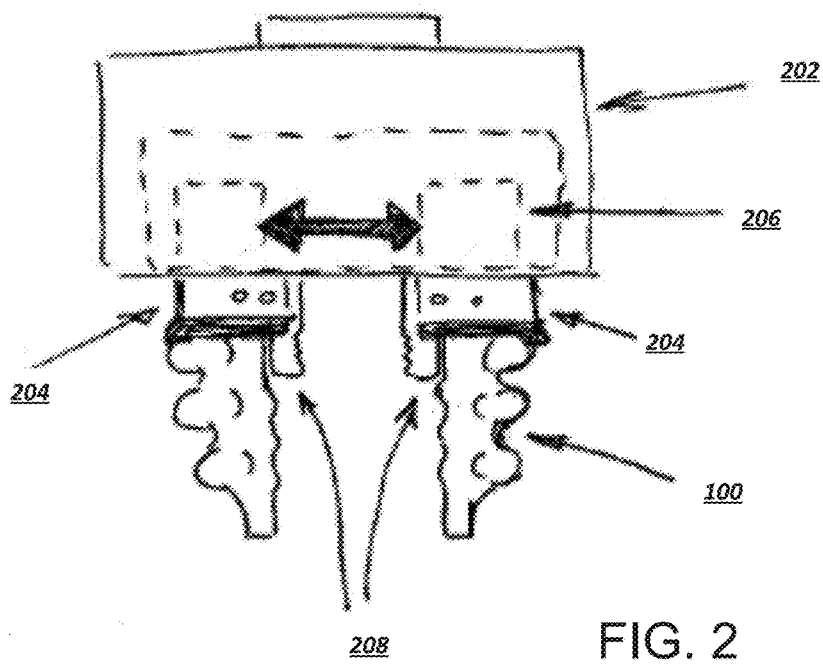
FIGS. 2, 3A, and 3B depict side views of a robotic end-of-arm tool (EOAT according to exemplary embodiments described herein.
Figure 3A:
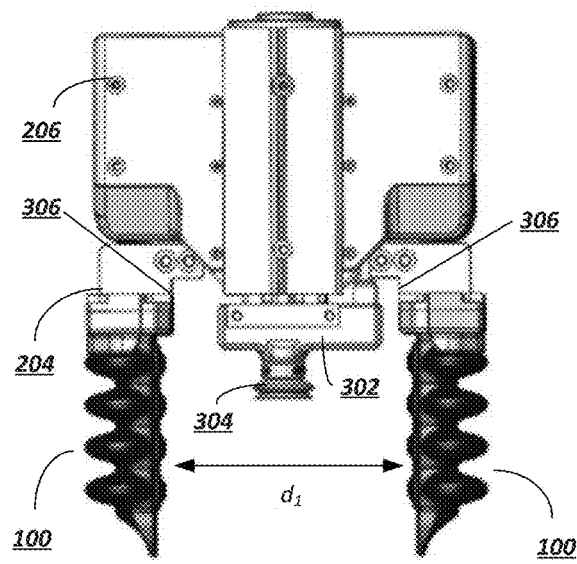
Figure 3B:
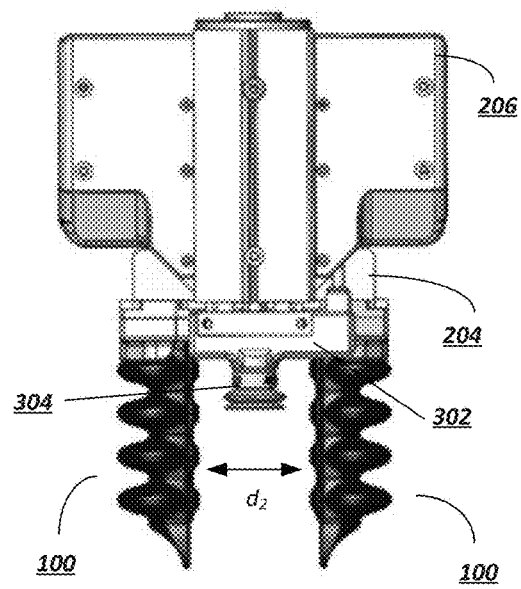

For example, FIGS. 2 and 3A-3B depict an exemplary EOAT 202 according to one embodiment. The EOAT 202 includes two soft actuators 100 (although the present invention is not limited to use with two actuators 100), each mounted to a jaw 204 that is connected to a mechanical actuator 206 inside of a hub of the EOAT 202.

The mechanical actuator 206 may include a motor, rails and a geared mechanism that mates with corresponding gears of the motor. When the motor is driven in one direction, the motion of the gears may cause the geared rails to move apart, pushing the jaws 204 away from each other (see, e.g., FIG. 3A, in which the jaws 204 are separated from each other by a first distance $d_1$). When the motor is driven in a different direction, the motion of the gears may cause the geared rails to move closer together, pulling the jaws 204 together (see, e.g., FIG. 3B, wherein the jaws 204 have been driven together by the actuator 206 so that they are positioned at a second distance d2 smaller than the first distance $d_1$).

In another embodiment, each jaw 204 may be connected to a separate mechanical actuator, so that the jaws 204 may be adjusted independently. In either embodiment, the jaws 204 may be configured to move in the same direction upon motion of the mechanical actuator 206 (e.g., moving both jaws 204 to the left or to the right in FIG. 2 by the same amount). Still further, the jaws 204 may be configured to move in the same or different directions, but to a different degree (e.g., with one jaw 204 moving more than the other, or one jaw 204 moving while the other remains still).

The actuator 206 is not limited to using a motor and rails, but may be actuated by any suitable technique. For example, in one embodiment a pneumatic system, such as a pneumatic linear actuator, is operable to receive a pneumatic fluid, such as air, in order to drive apart the hubs jaws 204 as they hubs are guided along the guide rails, or to eject the fluid in order to drive the jaws 204 together as they are guided along the guide rails. A pneumatic fluid supply tube may deliver the pneumatic fluid to or from the actuator 206. It is noted that different valving systems can be used to control motion of the pneumatic system. Alternatively or in addition to a pneumatic system, the gripper may be hydraulically adjustable via a hydraulic fluid.

The EOAT 202 may optionally include inner grip pads 208 which serve as a secondary gripping surface. The inner grip pads 208 may have different properties as compared to the actuators 100, such as being less compliant than the actuators 100, presenting a different surface texture than the actuators 100, having different surface properties as compared to the actuators 100, etc. The inner grip pads may be mounted to a mounting surface 306 of the jaw 204 (see FIG. 3A). The inner grip pads 208 are discussed in more detail in connection with FIGS. 4A-4B.

In some embodiments, the EOAT 202 may be provided with a sensor package 302, which may include (for example) a range finding sensor such as a LIDAR and/or a camera. The sensor package 302 may be used to automatically or, under the control of a human operator, guide the EOAT 202 to a grasp target and effect a grip on the target. The sensor package 302 may also be used to judge the size of, and distance to, a target object, thus allowing the jaws 204 to be adjusted to an appropriate separation distance depending on the width of the object to be grasped.

There are many scenarios where a suction cup gripper may be adept at removing objects from closely packed environments. A suction cup 304 may serve to provide improved grasping capability, better securing a target object held by one or more actuators 100.

In some instances the grip that the suction cup 304 obtains may not be strong enough to retain the object as the gripper is reoriented or rapidly accelerated or decelerated by a robot. In these instances, it may be useful to use a suction cup 304 to initially remove the object from a closely packed environment, and then further grip as well as cradle the object with soft actuators 100 which will secure the object as the gripper is reoriented or rapidly accelerated or decelerated.

The suction cup 304 and the actuators 100 may be mounted to a gripper hub. In some embodiments, a distal end of the suction cup 304 may be extensible to extend beyond the distal end(s) of the actuators 100. Accordingly, when the gripper is lowered over a target object to be grasped, the suction cup 304 makes initial contact with the target object.

Optionally, the gripper hub may be capable of applying a vacuum to the suction cup 304 in order to engage the suction cup 304 (causing the suction cup 304 to withdraw towards the gripper hub, as described in more detail in connection with FIGS. 17-18). More specifically, as long as an opening at the end of the suction cup 304 is blocked (e.g., by the grasp target), the suction applied to the cup 304 has the effect of collapsing one or more accordion folds of the cup 304. In addition, this force may be used to retract the suction cup, as described in more detail below.

Once the target object is pulled clear of other objects in the environment, the actuators 100 may be actuated in order to grasp and further secure the target object.

In some embodiments, the suction cup 304 does not substantially change length upon applying vacuum. In these cases, the actuators 100 may be reverse curled so that they do not interfere with the suction cup's 304 ability to contact the object and gain an initial grasp. After the object has been grasped and pulled away from its cluttered environment by the suction cup 304, the vacuum in the soft actuators 100 may be replaced by positive pressure in order to allow the soft actuators 100 to apply a gripping force to the grasp target.

Figure 4A:
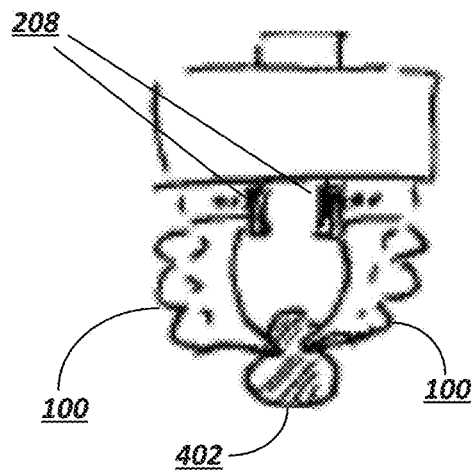
FIGS. 4A-4D depict exemplary grasping techniques according to exemplary embodiments.
Figure 4B:
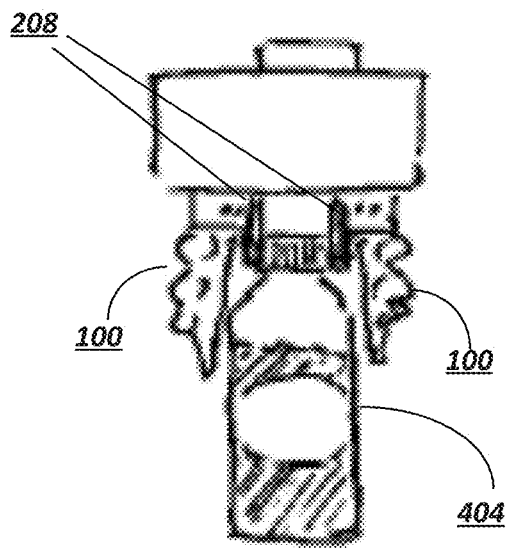

FIGS. 4A-4B depict an exemplary use of the inner grip pads 208. In these examples, the EOAT is first called upon to grasp a relatively small, compliant object 402, and then a relatively large, rigid object 404.

When grasping the compliant object 402, the actuators 100 are first moved to an appropriate distance via action of the mechanical actuator and are moved into a grasping position by moving the EOAT over the target object 402. Then, the actuators 100 are actuated in order to secure a grasp on the target object 402.

However, it may be difficult for the soft actuators 100 to pick up large or heavy objects. Moreover, while the actuators 100 are adept at picking up soft or compliant objects without damaging them, this may not be a concern for rigid or hard objects, such as the object 404. In this case (see FIG. 4B), the EOAT may be lowered further over the object 404 in order to place a portion of the object 404 within the range of the inner grip pads 208. Because the inner grip pads are less compliant (e.g., are more rigid) than the actuators 100, the inner grip pads 208 may be able to secure a stronger grip on the object 404. To this end, the inner grip pads 208, which are attached to the jaws 204, may be moved through action of the mechanical actuator 206 to close around the portion of the object 404. This exemplary technique is particularly useful for grasping heavy rigid objects, such as bottles, cans, high density objects, metallic objects, etc.

As can be seen by comparing FIG. 4A to FIG. 4B, the presence of the inner grip pads 208 allows a single EOAT to make use of two different gripping modes, one for hard objects and one for soft or easily damaged objects.

Figure 4C:
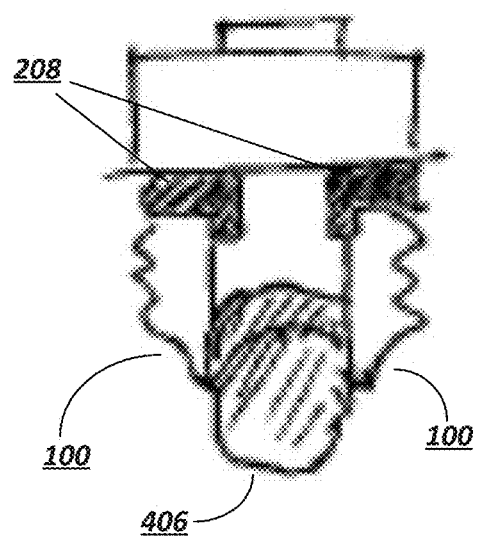
Figure 4D:
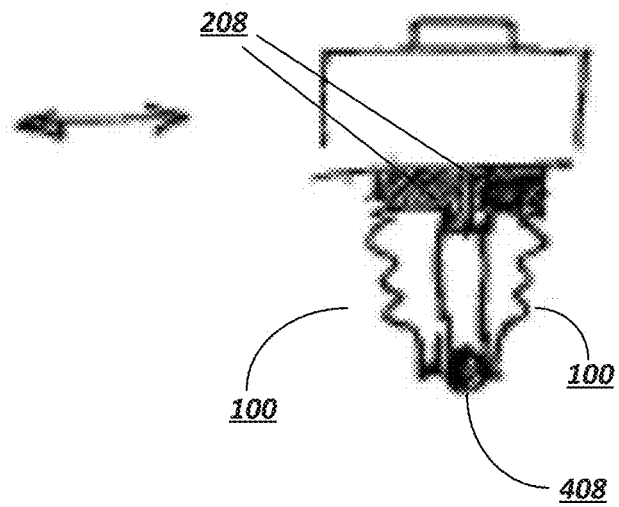

Another way to enable multiple gripping modes is through the use of the soft actuators 100. In a normal gripping mode, the actuators 100 are inflated in order to cause them to curl and grasp an object (as shown in FIG. 4A). However, another option is to maintain the actuators in a straight, neutral state (i.e., neither positively inflated so as to cause the actuators 100 to curl, nor negatively inflated so as to cause the actuators 100 to reverse curl). In this state, the mechanical actuator 206 can move the jaws 204 towards each other to secure a target object 406, 408 between the actuators, as shown in FIGS. 4C and 4D. As shown in these examples, this technique may be used to grasp both relatively large objects 406 and relatively small objects 408 with the same EOAT.

This may result in a better grasp, as compared to curling the actuators 100, when it is important to present a larger gripping surface (due to the actuators 100 remaining in a straight, rather than curled, configuration). For instance, if the gripping surface on the inside walls of the actuators 100 is textured to promote a stronger grip, it may be helpful to expose more of this textured surface to the target object 406, 408 than would be possible if the actuators 100 were curled.

This technique can also be used when the actuators are positively inflated in order to adjust or maintain grip force control. For example, if the EOAT detects that the grasp on the target object is loosening, the EOAT could supply additional inflation fluid to the actuators 100, but could also or alternatively move the jaws 204 closer together. Similarly, if it appears that an object is being held too rigidly (e.g., it appears as though it might become damaged), the EOAT can deflate the actuators 100 and/or move the jaws 204 further apart.

The presence of the mechanical actuator 206 also allows for other types of unique control schemes. For example, FIGS. 5A-5B depict an embodiment in which the distance between the jaws 204 is adjusted to maintain an optimized grip on a target object 502.

In FIG. 5A, the actuators 100 are reverse-curled so as to move them out of the way of the target object 502. Upon moving into a suitable position over the target object, the actuators 100 are neutrally inflated so as to remain in a straight configuration (FIG. 5B). In this state, the actuators 100 exert a force $F_a$ on the target object, which results in an opposing outward force $F_a$ on the jaws 204. Simultaneously, the actuator 206 may be configured to maintain an inward force $F_j$ on the jaws 204. As the actuators 100 are inflated more substantially in order to maintain a stronger grip on the target object 502, the jaws 204 are pushed further apart and the actuator 206 counters with a stronger force $F_j$ (and vice versa). A controller may attempt to maintain the force $F_j$ such that $F_j \geq F_a$. Accordingly, the EOAT provides a self-leveling or self-optimizing grip on the object 502 as equilibrium is reached between the jaw spacing and the actuator 100 grip posture on the object 502.

Figure 6:
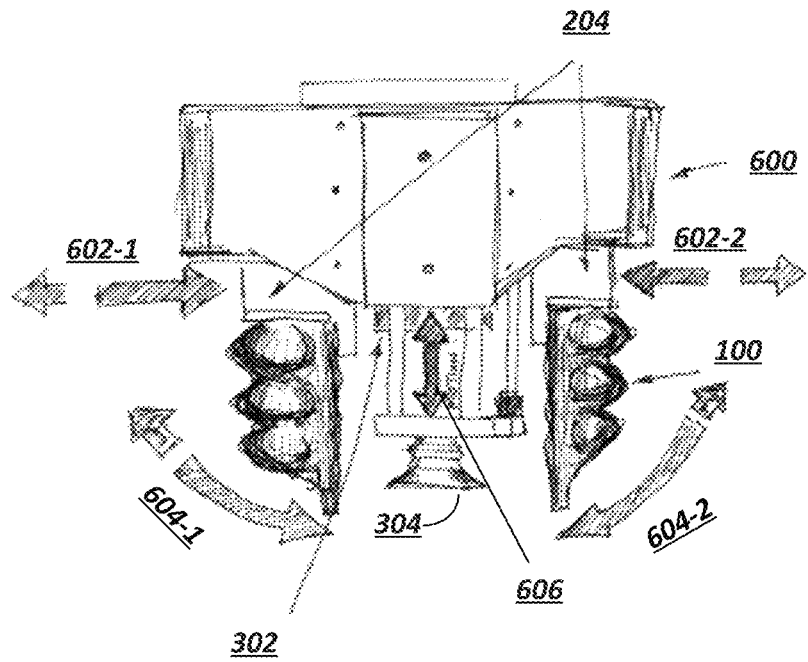
FIG. 6 depicts a side view of an exemplary EOAT having a sensor package and a vacuum cup.

FIG. 6 provides an overview of the different ways in which various components of the EOAT can move. As shown by the arrows 602-1, 602-2, each of the jaws 204 are capable of independent or dependent movement laterally with respect to the EOAT (e.g., left-to-right in FIG. 6, or perpendicular to a direction in which the actuators 100 extend when in a neutral configuration). The actuators are capable of moving in a circumferential direction 604-1, 604-2 with respect to the EOAT. Furthermore, the suction cup 304 is capable of moving in a longitudinal direction 606 perpendicular to the lateral direction and parallel to the direction of extension of the actuators 100 when in a neutral configuration.

Figure 7:
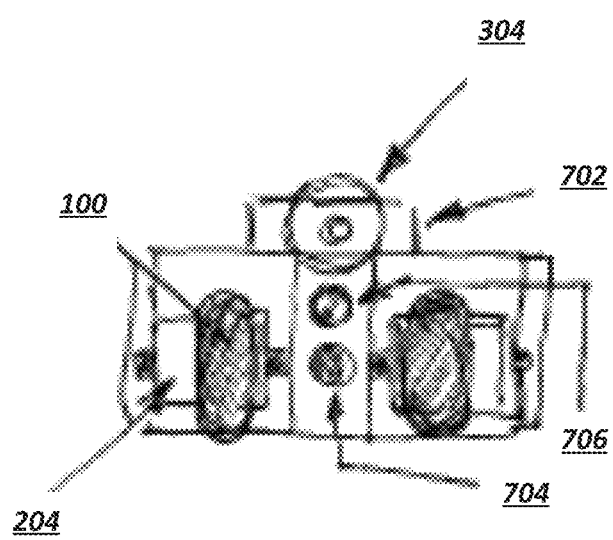
FIG. 7 depicts a bottom view of the EOAT of FIG. 6.
Figure 9:
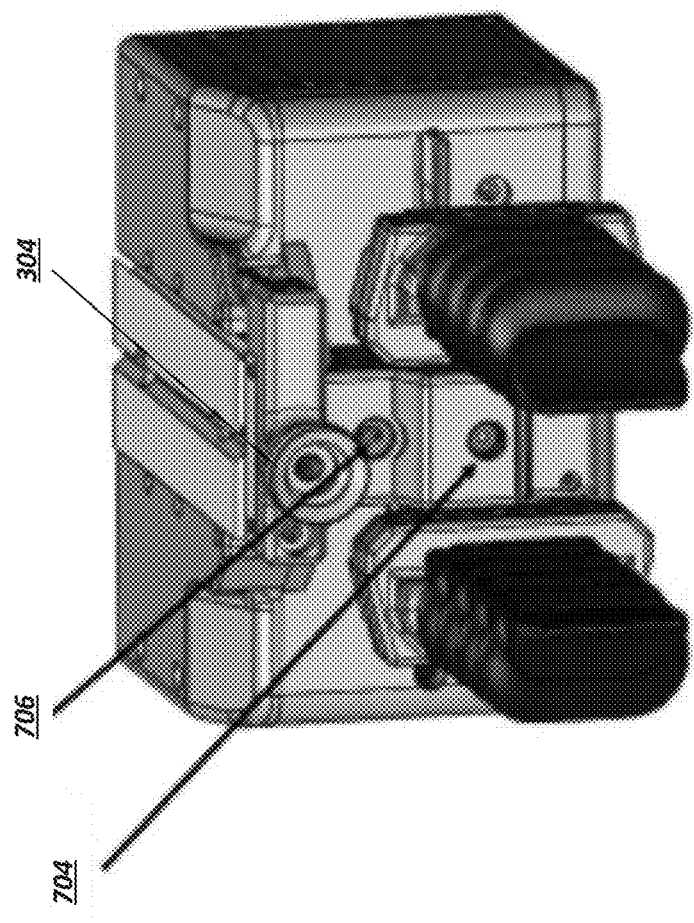
FIGS. 8-9 depict perspective views of the EOAT of FIG. 6, in a wide-actuator configuration and a narrow-actuator configuration, respectively.
Figure 8:
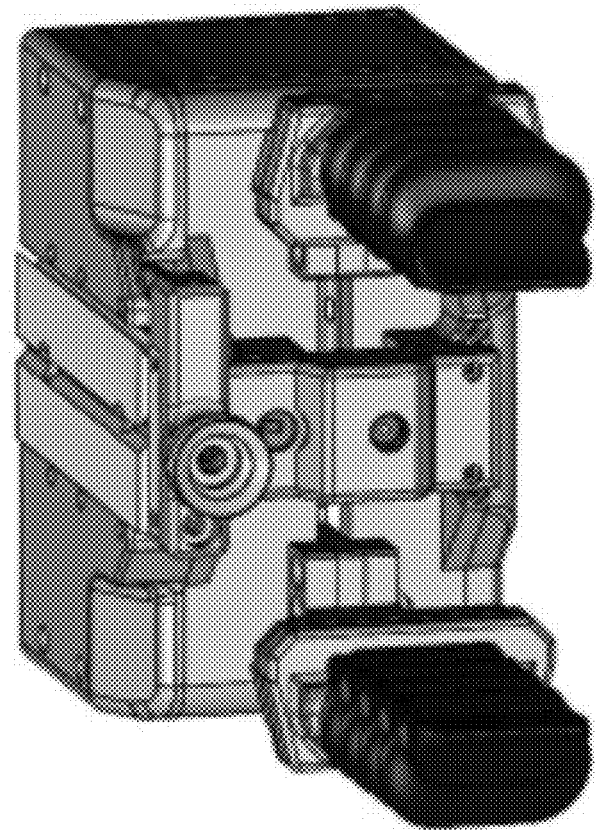

FIG. 7 provides a bottom view of the EOAT, in which the sensor package 302 is visible; FIGS. 8 and 9 show the same EOAT in a perspective view (FIG. 8 depicts the EOAT with the actuators 100 in a wide configuration, while FIG. 9 depicts the EOAT with the actuators 100 in a narrow configuration).

In this example, the sensor package 302 includes a range finder 706 and a camera 704, although one of ordinary skill in the art will recognize that other sensors may also be used. The sensors are configured to be equidistant from the actuators 100 so as to allow for better positioning of the EOAT over the target object.

The camera 704 may be used to estimate a width of the target object, and/or may be used to estimate surface properties or characteristics of the target object (e.g., whether the target object is likely to be slippery or is textured, whether the target object is compliant or rigid, whether the target object is fragile, etc.). Other sensors may also be used for this purpose. In some cases, the camera 704 may be used to perform object recognition, and the EOAT may receive signals from a controller that maintains a database of objects against which the camera signals may be matched. Depending on which object in the database is mapped to the object currently being viewed by the camera, the controller may provide the EOAT with information pertaining to the target. In some embodiments, based on the object recognition, the EOAT may select a suitable grasping mode (e.g., using the inner gripper pads 208, using the actuators 100 in a straight, neutral configuration with assistance from the jaws 204, inflating the actuators 100, or some combination of these techniques).

The range finder 706 may be used to estimate a distance to the target object, so that the EOAT can be lowered to engage a target portion of the target object according to the grasping mode selected. For example, if the grasping mode involves use of the inner gripper pads 208, the EOAT may be lowered so that a target portion of the target object will be engaged by the inner gripper pads 208, instead of by the actuators 100. On the other hand, if the actuators are to be used, the EOAT may be lowered so that the target object will be contacted by the actuators 100 without interference by the inner gripper pads 208.

As shown in FIG. 9, the sensor package 302 is sized and positioned so that the actuators 100 and/or inner gripper pads 208 will not interfere with the sensor package when the jaws 204 are moved together into their closest configuration.

In some embodiments (as shown for example in FIGS. 10-12), the suction cup 304 may be attached to a retractable rod controllable through an actuator 1002. In these cases, the suction cup 304 may be extended towards a grasp target by action of the rod by the actuator 1002. The suction cup 304 may seal with the grasp target, at which point the rod may be retracted back towards the gripper hub using the actuator 1002 thus drawing the grasp target back towards the actuators 100 attached to the gripper hub. The actuators 100 may then be actuated in order to hold and cradle the grasp target.

Figure 13:
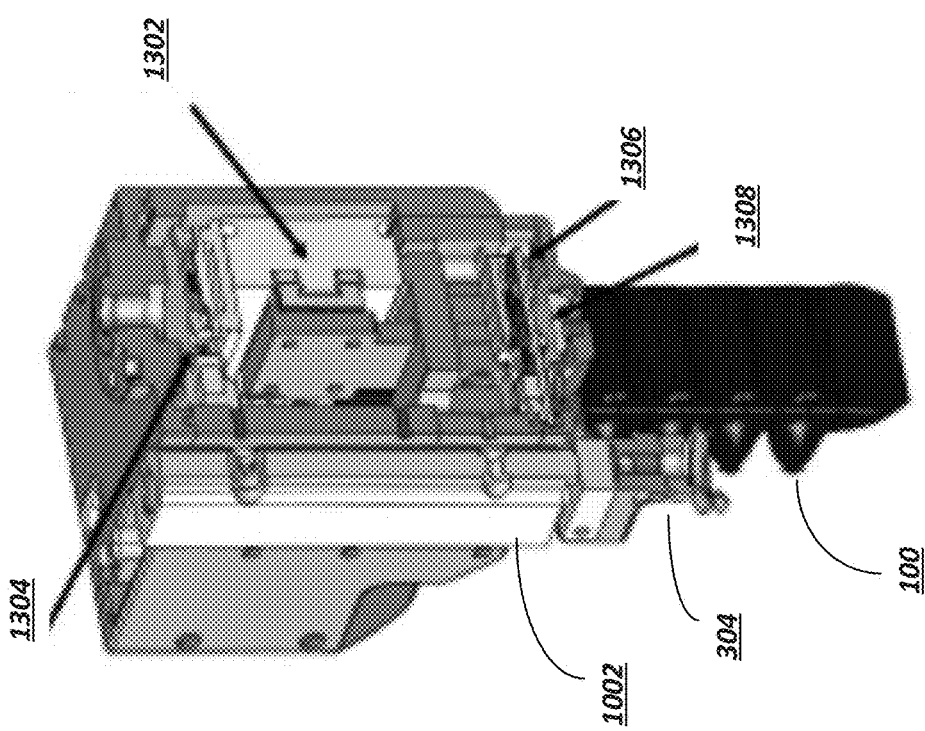
Figure 16:
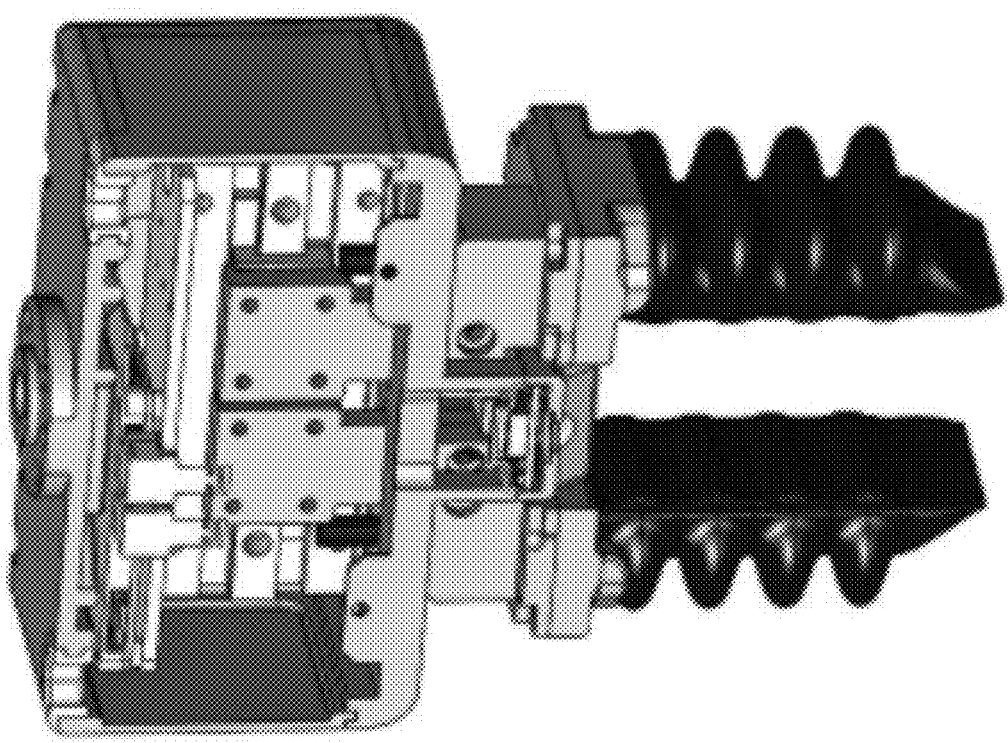

FIGS. 13-16 are cross-sectional views showing the internal structures of the EOAT. For instance, FIG. 13 depicts the internal rail 1302 used to move the jaws 204 via the actuator 206. In the depicted embodiments, motion of the EOAT and actuation of the various actuators 100, 206, 1002 may be governed by an EOAT controller 1304. The EOAT controller 1304 may receive and process signals from various sensor controllers, such as a range finder controller 1306 and a camera controller 1308. The EOAT controller 1304 may, for example, perform the procedure depicted in FIG. 19.

Figure 15:
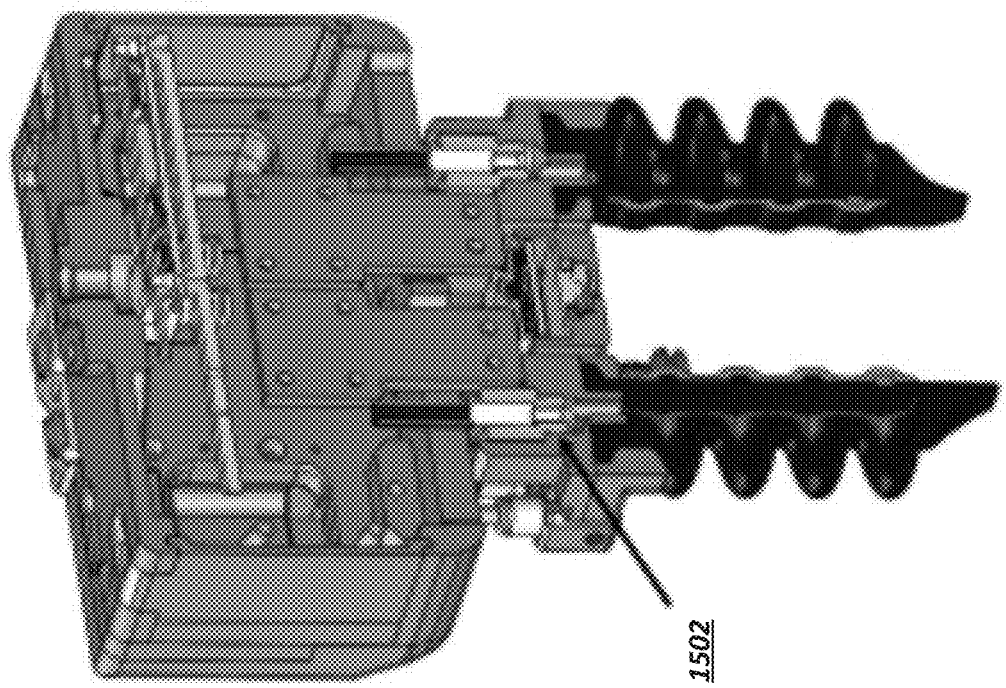

As previously noted, an inflation fluid may be provided to an internal void of the actuators 100. FIG. 15 depicts an exemplary movable fluid passage 1502 for the soft actuators 100. In operation, fluid may be provided from an inflation fluid supply line connected to the EOAT, routed through the EOAT to the movable fluid passage 1502, and from there into the internal void of the actuator 100 (and vice versa). The movable fluid passage 1502 may be configured to move with the jaws 204 so that fluid can be delivered to the actuators 100 regardless of the configuration of the jaws 204.

Figure 17:
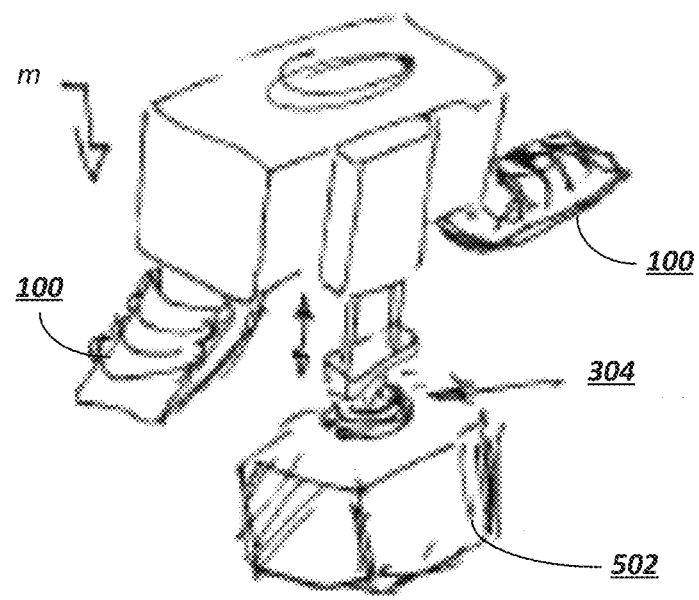
FIGS. 17-18 depict various structures allowing a suction cup on an EOAT to be efficiently retracted according to exemplary embodiments.

FIG. 17 depicts a technique for retracting the suction cup 304. In this example, the air pressure or force used to push the suction cup 304 to an extended position via the actuator 1002 may be regulated to provide an optimized force value (in a similar manner to that described in connection with FIG. 5B). In this case, the system may balance the downward force applied to extend the suction cup 304 with the upward force exerted on the suction cup 304 by the target object 502. Thus, the actuator 1002 may be back-driven by contact with the object 502 so that the suction cup 304 automatically retracts as the EOAT is lowered towards the object 502.

Figure 18:
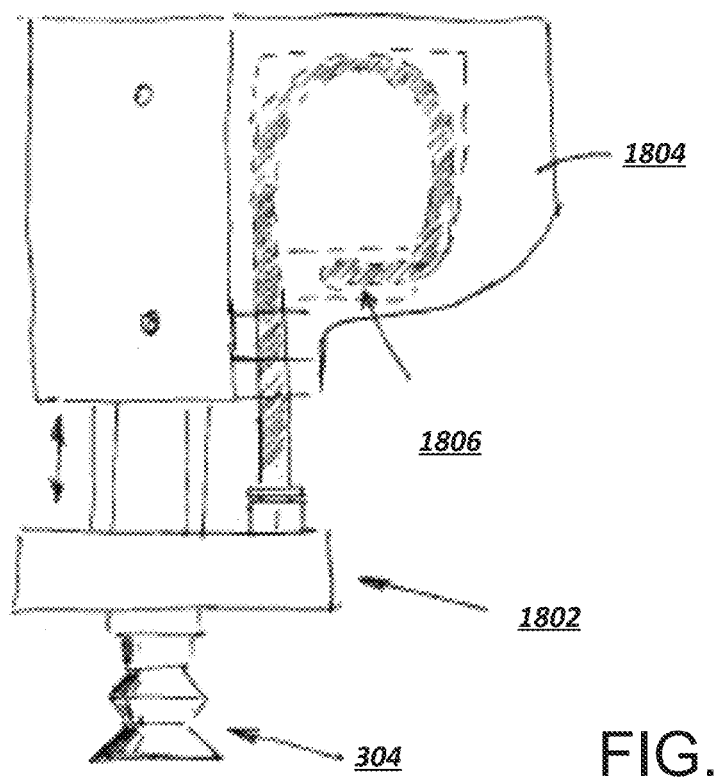

Another retraction technique is depicted in FIG. 18. In this example, the suction cup 304 is attached to a manifold bar 1802, and a vacuum is applied through the manifold bar 1802 by suctioning fluid through pneumatic tubing. The pneumatic tubing is pinned inside of a cover 1804 of the EOAT at a location 1806. The pneumatic tubing and cover 1804 have several properties that allow the tubing to self-retract into the cover 1804 in this configuration. First, an outer surface of the pneumatic tubing has a relatively low coefficient of friction (COF). Second, the tubing has sufficient stiffness so that it can act as a spring. Furthermore, the cover 1804 has a particular constraining shape so that the spring-like tubing, when secured at the location 1806, attempts to take on a larger curved radius than the cover 1804 constrains it the tubing be in. This causes the tubing to be pushed up into the cover 1804, which is facilitated by the low COF of the tubing surface.

Grasping Method

Figure 19:
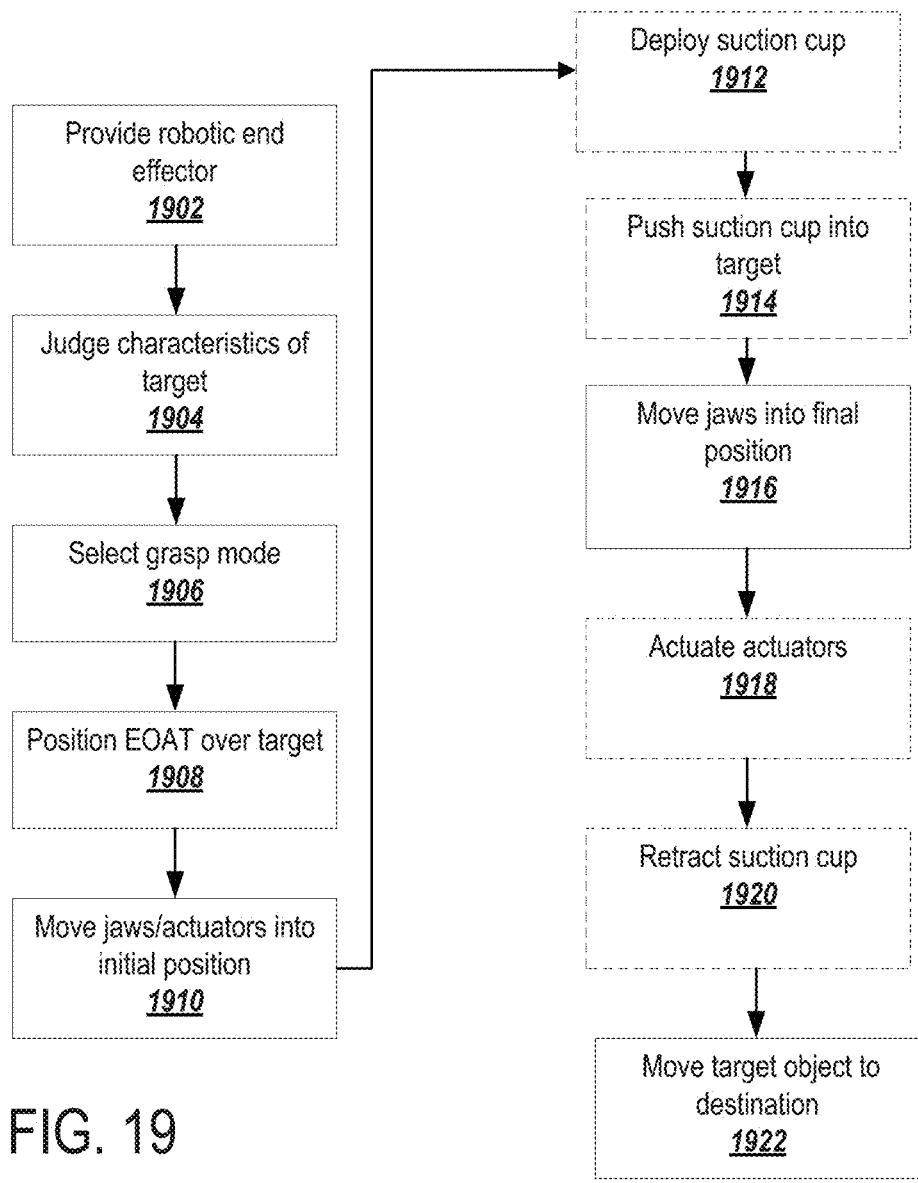
FIG. 19 is a flowchart describing an exemplary grasping technique in accordance with exemplary embodiments.

FIG. 19 describes a procedure for deploying and using an end effector as described above. In FIG. 19, blocks surrounded by dashed lines represent optional steps to be used when a suction cup is to be employed. Blocks surrounded by dashed-and-dotted lines represent optional steps to be used when the gripping mode relying on the soft actuators (rather than the inner grip pads) are employed.

At block 1902, a robotic end effector may be provided and affixed to a robotic system (e.g., a robotic arm). The robotic end effector may be a robotic end effector as depicted and described herein.

At block 1904, the system may judge characteristics of a target object to be grasped. These characteristics may include: the distance to the target object; the size, shape, or configuration of the target object; a type of the target object (as detected, e.g., by object recognition as described above); properties of the target object (as received, e.g., from an object library or database as described above); etc.

At block 1906, the system may select a grasp mode for the target object based on the characteristics identified in block 1904. Grasp modes may include, for instance, a first grasp mode employing inner grip pads. Such a grasp mode may be used if the object is determined to be relatively hard, rigid, or heavy. Another grasp mode may include a neutral actuation grasp mode, in which the actuators are maintained in a straight configuration and pushed into the target object through action of the jaws. This grasp mode may be selected if the size, shape, configuration, and/or properties of the target object suggest that more gripping surface would be beneficial in securing a strong grasp of the target. Yet another grasp mode may include positive actuation of the actuators, with or without action of the jaws. This grasp mode may be selected if the target object is determined to be relatively compliant or fragile, or if the size, shape, or configuration of the object indicate that it would be difficult to grasp with the inner grip pads.

At block 1908, the EOAT may be moved into proximity with the target object. In some embodiments, this may involve making contact with the target object, while in others the EOAT may be moved to within a predetermined distance of the target object. The distance selected may be dependent upon the grasp mode selected in block 1906. The movement of the EOAT may be guided by various sensors, such as proximity sensors, cameras, touch sensors, etc. In some embodiments, the EOAT may be positioned in this block so as to be relatively centered over an axis of the target object. The axis of the target object may represent a grasping axis along which the actuators may be arrayed (e.g., along a long axis of the bumper plate when the object is grasped).

At block 1910, the jaws and/or actuators may be moved into an initial position, which may be dependent upon the grasp mode selected at block 1906. For example, the jaws may be moved to an initial position that positions the inner grip pads and/or actuators at a sufficient distance apart that they will not interfere with the target object as the EOAT is moved into position. In some embodiments, this may involve applying a vacuum to reverse-inflate the actuators 100 in order to move them out of the way. In some embodiments, the jaws may be moved to a lesser degree than they otherwise would be based on a determination (e.g., from the camera in the EOAT's sensor package) that the target object is in a crowded environment. If a controller determines that a portion of the EOAT would be interfered with by an object in the environment, the controller may order the jaws to a more narrow position than would have otherwise been called for. In some embodiments, the position of the jaws and/or the inflation status of the actuators 100 may be manipulated as the EOAT moves through the environment (e.g., narrowing a profile of the EOAT to fit into a relatively tight space before extending the jaws and/or actuators).

At block 1912, the system may optionally deploy a suction cup. The suction cup may be lowered by a suction cup actuator into proximity with a target object. At block 1914, the suction cup may be pushed into the target, which may optionally cause the suction cup actuator to begin to retract as described in connection with FIG. 17.

At block 1916, the jaws may be moved into a final grasping position. The final grasping position may be a position of the jaws as the target object is grasped, and may depend on the grasp mode selected in block 1906. For instance, if the inner gripper pads are used to grasp the object, the jaws may be moved to push the inner gripper pads into the target object to secure a grip on the target object. If the actuators 100 are to be used, the jaws may be moved into position to allow the distal tip (or as much of the gripping surface of the actuators as possible) to be pressed into a target portion of the target object, upon actuation of the actuators (which may be performed in block 1918, if appropriate to the selected grasp mode).

Blocks 1916 and 1918 may be carried out individually or together. For example, the action of the jaws may balance the action of the actuators as both exert a force on the target object, as described in connection with FIG. 5B.

At block 1920, the suction cup may optionally be retracted. In some embodiments, the retraction may be performed automatically, as shown in FIG. 18.

Having thus secured the target object in the grip of the EOAT, at block 1922 the EOAT may be translated and/or rotated to move the target object to a desired destination or configuration.

The above-described method may be embodied as instructions or logic stored on a non-transitory computer-readable medium. When executed, the instructions or logic may cause a processor circuit to perform the above-described method using a robotic system.

Additional Detail

With respect to the above description, as shown in FIGS. 15 and 21A through 21C, the soft robotic grasping system may apply fluid pressure to the fingers 100 in any position of the jaws 204 in order to grasp an article (402, 404, 406, 408, 502). The gripper hub 202 provides routing for the finger actuator 120 (such as inflation device 120), and the finger actuator applies a pressure change—typically fluid pressure (gas or liquid), and changing among positive, neutral, and negative gauge pressure. The routing directs pressure (equally, distributed, or controlled) to the p soft robotic fingers 100. Each soft robotic finger 100 includes the elastomeric outer surface 3005 surrounding the internal void 3004, and is configured to curl in a first degree of freedom (corresponding to a direction of arrows 604 in FIG. 6) when the finger actuator 120 applies the pressure change within the internal voids 3004. A plurality of linkages, such as the base members supported by the rails 1302, support and move the fingers 100, and may include another acting member such as jaws 204. As described herein, the linkage is one or more moving connections between the hub and the fingers. One example would be a linear actuator, in which the supporting member and rail 1302 together include a linear motor, electrically driven to form actuator 206. Other examples of linkages would be a rack and pinion, screw or ball screw, four-bar linkage, cam, and/or gear train, each driven by a motor or fluid power to form actuator 206. In this case, each linkage respectively connects a soft robotic finger 100 to the hub 202, and is configured to guide in a second degree of freedom (corresponding to the translation direction arrows 602 in FIG. 6, or the pivoting direction arrows 2402 in FIGS. 24A and 24B) to change a pose of the connected soft robotic finger 100 relative to the hub 202. The second degree of freedom need not be a simple translation or rotation, but may be guided along a path by a cam, swing arm, groove or the like. The linkage actuators such as the electric or fluid power drives are connected to the linkages and cause the linkages to move.

As shown in a front view in FIG. 20A, each gripper hub 202 may have soft robotic fingers 100 connected to the hub 202 via linkages (here including moving members 204 and rails 1302, and driven as actuators 206). Along a center axis CA region, a camera 704 and/or a vacuum cup 304 may be arranged. The vacuum cup 304 may be extendible via an extension arm 304 (which may be a guided rod, a scissor linkage, or other extending linkage). As shown in FIG. 20B, in a side view of the gripper hub 202, the camera 704 may be placed in the center along the gripper direction, between the two fingers 100, with the vacuum cup 304 and extension actuator 309 offset from the center axis CA to the side. Alternatively, as shown in FIG. 20C, in a side view of an alternative gripper hub 202, the vacuum cup 304 and extension actuator 309 may occupy the line along the gripper direction, with a camera 704 offset from the center axis CA to the side (or, as shown, two cameras 704 offset similarly).

As shown in FIGS. 15 and 21A through 21C, each soft robotic finger is connected to a fluid passage tube 1502 for providing fluid to the soft robotic fingers 100. The fluid passage tubes are formed to move according to the linkages (when the linkages are caused to move), and are configured to provide the pressure change to the internal voids 3004 in any position reached by any soft robotic finger 100, even according the first and second degrees of freedom. For example, FIG. 21A shows the linkages arranged with the fingers 100 in an ungrasped, reverse curled position (e.g., corresponding to negative gauge pressure), and also closest together (potentially applying a clamping force in the direction of arrows 602), while FIGS. 21B and 21C show the linkages arranged with the fingers 100 in respective neutral and curled grasping positions (e.g., respectively corresponding to neutral and positive gauge pressure), and also farthest apart in the direction of arrows 602.

As shown in FIGS. 22A and 22B, fluid may be routed from the inflation device 120 via the hub 202 treating the hub 202 as a distributing manifold. In this case, the hub is sealed with respect to the fluid pressure via hub seal 202A, and each linkage is sealed with respect to the fluid pressure via linkage seals 1302A (for example, applied via rails 1302). In this case, the seals 1302A are linkage fluid seals 1302A about the linkages, and the linkage fluid seals 1302A permit the linkages to move while sealing fluid flow to the fluid passage tubes 1502. The hub seal 202A includes a fluid seal about the hub 202 retaining interior fluid pressure, and the finger actuator 120 applies the pressure change to the interior of the hub 202, and the pressure change is transmitted, contained by the linkage fluid seals 1302A and hub seal 202A, via the fluid passage tubes 1502 to the soft robotic fingers 100.

FIG. 22B depicts a more complete system, where the gripper hub 202, together with its fluid routing, camera, vacuum cup, linkages, and their respective actuators (as detailed herein) is mounted to a robot arm RA, which may be a 3-7 (or more) axis robot arm extending from a base RA BASE. The 3-7 axes are additional degrees of freedom for the gripper hub 202 and soft robotic fingers 100 as discussed herein. As shown, although some actuators and circuit boards may be positioned within the gripper hub itself, the soft robotic gripper system may also include actuators, circuit boards, fluid and vacuum supplies, and motor drivers and other components away from the gripper hub 202 (e.g., in a cabinet or control panel adjacent the robot arm RA). FIGS. 22A and 22B show local and remote routing of fluids, vacuum, sensing, and control to a controller 136, a fluid delivery device 128 (and/or independent second fluid delivery device 128a), a pressure transducer 129 detecting a fluid pressure to the fingers 100, a suction actuator 305 (such as a vacuum source), a pressure transduce 303 detecting a fluid pressure in the suction actuator 305, a driving motor 207 and/or motor driver 207a for driving the linkages to translate or rotate the fingers 100 (the driving motor and/or driver 207a may be electric, and/or fluid power, e.g., hydraulic or pneumatic, and may be located within, adjacent to, or remote from the gripper hub 202).

Figure 12:
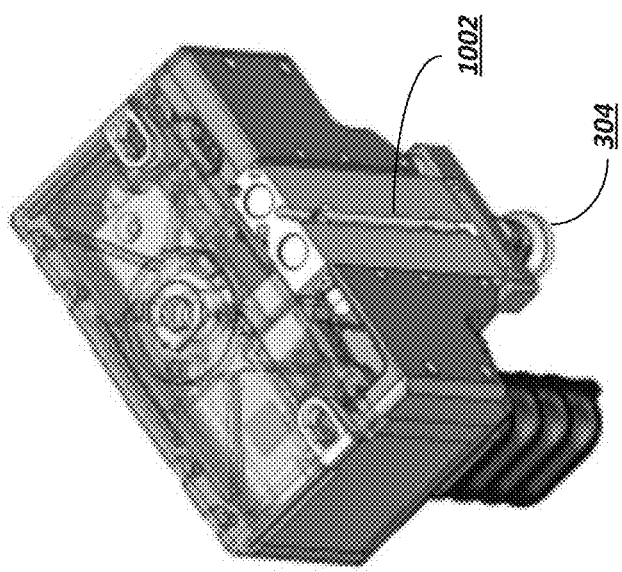
FIGS. 10-12 depict various perspective views of the EOAT of FIG. 6.
Figure 11:
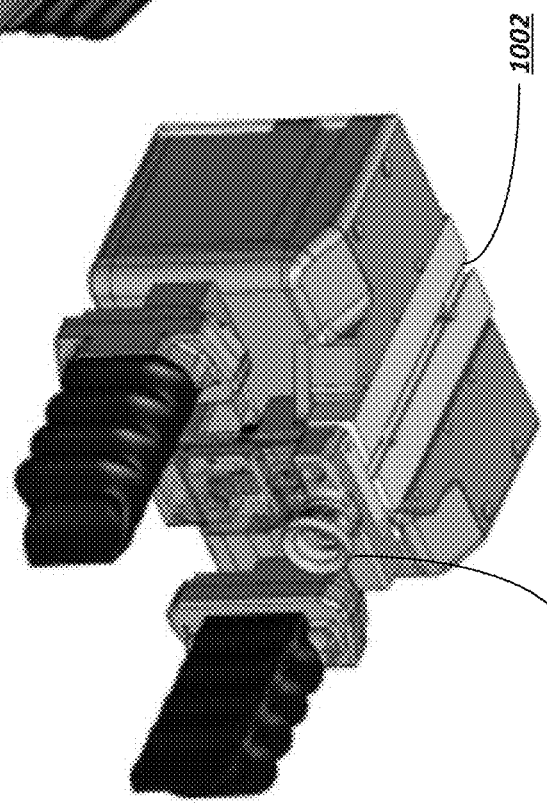
Figure 10:
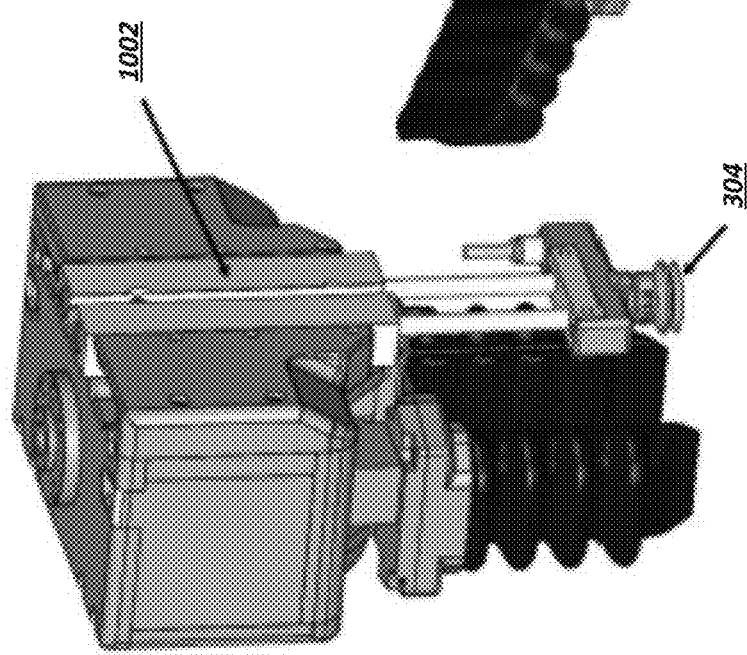
Figure 14:
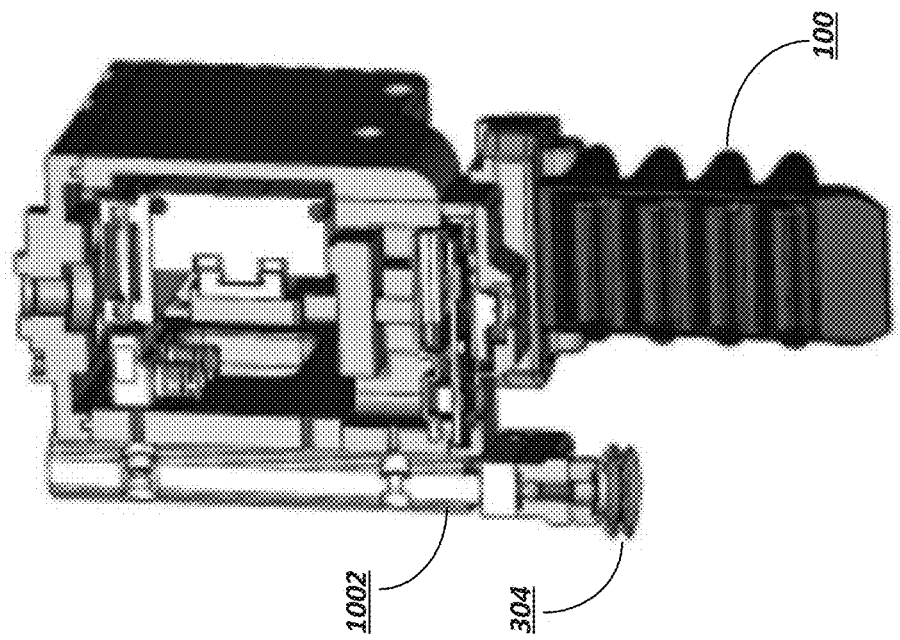
FIGS. 13-16 are cross-sectional views showing an interior of the exemplary EOAT of FIG. 6.

As described herein, and as shown in FIGS. 21A-21C and 22A-22B, a suction actuator 305, such as a vacuum source, applies a second pressure change, which is routed to the suction cup 304 in any extension position of the suction cup 304 and is configured to apply a suction force according to the second pressure change. Accordingly, the suction cup 304 has an additional fluid passage tube 307, which is also movable and sealed while moving. An extension linkage, such as the rod, rail, and optionally linear motor forming actuator 1002 (e.g., as shown in FIGS. 10-12) connects the suction cup 304 and the gripper hub 202, the extension linkage 309 being configured to extend and retract to change a pose of the suction cup to the hub.

The controller 136, 1304 may be configured to activate the suction cup 304 and extension actuator 309 to cause the suction 304 cup to contact the article (e.g., article 402, 404, 406, 408, or 502), lift the article by the suction force, and retract the article toward the gripper hub 202. The controller 136, 1304 may also activate the finger actuator 120 to cause the soft robotic fingers 100 to curl to apply a grasping force to the article.

The soft robotic grasping system, including the gripper hub 202, fingers 202 that curl (among curling in, neutral, and curling out) via pressure change, and linkages (as described, one or more moving connections between the hub and the fingers) that move each finger 100 in an additional degree of freedom, may combine the forces from the curling fingers and the linkage actuator. In this case, the linkage actuator(s) (e.g., electric motor or fluid power moving the linkages) are configured to cause the linkage to move while the soft robotic fingers 100 curl in with a grasping force, and the soft robotic fingers 100 are moved to grasp according to the combined curling of the fingers 100 (and, e.g., curling force) and first degree of freedom (and, e.g., clamping force).

As shown in FIGS. 23A-23B and 24A-24B, the first degree of freedom may be one of one of translation or rotation. In FIG. 23A, the linkage, using the rail 1302 and actuator 206, supports the fingers 100 to move in the translation direction indicated by arrows 602 (toward and away from the central axial CA region of the gripper hub 202), and the fingers 100 are shown in an inner or innermost translation position, curled outwardly, facing an article to be captured. In FIG. 23B, the fingers 100 have been translated by the linkage to an outer or outermost translation position, curled inwardly, holding an article. Although FIG. 23A shows the curled outward position of the fingers 100 together with the inner or innermost translation position of the fingers 100, the translation direction of the linkage and the curling direction of the fingers 100 are independent and may be opposite to that shown—for example, the fingers 100 may be curled outward and in an outer or outermost position of the linkage, and/or the fingers 100 may be curled inward and in an inner or innermost translation position of the linkage.

In FIG. 23B, the linkage, using the pivot 1305 and actuator 206, supports the fingers 100 to move in the rotation direction indicated by arrows 2402 (toward and away from the central axial CA region of the gripper hub 202), and the fingers 100 are shown in an outer rotation position, curled outwardly, facing an article to be captured. In FIG. 23B, the fingers 100 have been rotated by the linkage to an inner rotation position, curled inwardly, holding an article.

As FIG. 23A shows the curled outward position of the fingers 100 together with the inner or innermost translation position of the fingers 100, and FIG. 24A shows the curled outward position of the fingers together with an outer rotation position of the fingers 100, it can be seen the translation or rotation direction of the linkage and the curling direction of the fingers 100 may be independent, or may be linked—for example, the fingers 100 may alternatively be curled outward and in an outer translation position of the linkage, and/or the fingers 100 may be curled outward and in an inner rotation position of the linkage. The independent positioning of two degrees of freedom may be used to, for example, not only combine the forces of the two actuators (linkage—clamping and soft finger—curling), but also to fit the fingers 100 through narrower gaps or into narrower containers, as well as open the fingers 100 as wide as possible (translated or rotated outward and curled outward) or close them as narrowly as possible (translated or rotated inward and curled inward).

It should be noted that although at least two symmetric fingers and corresponding linkages (e.g., linear actuators) are shown in each drawing connecting fingers 100 to the hub 202, the invention herein may use any number of fingers 100 from a single finger 100 and/or linkage to multiple fingers 100 and/or linkages, and may in addition or alternatively press the article (e.g., article 402, 404, 406, 408, or 502), against a rigid member, side plate, spatula, or palm plate.

Again, as shown throughout, and in FIGS. 23A-23B and 24A-24B, the translation or rotation linkages may be joined by an astrictive effector such as the suction cup 304, configured to apply an astrictive force, and extension linkage may connect the astrictive effector and the gripper hub 202, configured to extend and retract to change a pose of the astrictive effector relative to the hub 202. The first degree of freedom (of the linkage) may apply a clamping force, and the curling may apply a grasping force. The controller 136, operatively connected to each and all of the astrictive effector, the finger actuator 100 and the linkage actuator 206, may be configured to activate the astrictive force, the clamping force, and the grasping force in a predetermined order (e.g., first the astrictive force, then the grasping force, then the clamping force). Alternatively, or in addition, the controller 136 may be configured to maintain the grasping force and clamping force (and optionally the suction force) in a predetermined relationship to one another. For this purpose, one or more feedback sensor (e.g., such as pressure transducer 129, measuring fluid pressure within the finger(s) 100, and/or force or pressure transducer 303, measuring fluid pressure within the suction cup 304, and/or back EMF or pressure force in the linkage actuator, as shown in FIGS. 22A and 22B) may be connected to the controller 136.

In some cases, as shown in FIGS. 20A-20C, 25A-25C, and 26A-26C, the hub 202 may have an axial center region about an axial center CA line. In one implementation, a camera 704 is positioned in the axial center region and is configured to direct the optical axis of the camera 704 along the axial center line, and the astrictive effector (e.g., suction cup 304) and extension linkage 309 are positioned adjacent the axial center region and configured to direct the extension of the astrictive effector parallel to the axial center line.

Figure 25A:
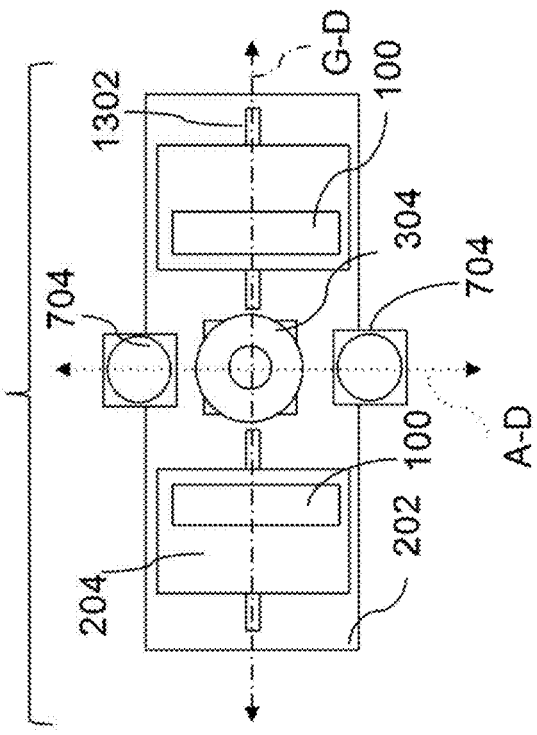
FIGS. 25A through 25C are schematic bottom views of a differing arrangements of sensors and actuators along a gripping direction and accessory direction, for a bilaterally symmetric gripper hub.
Figure 25B:
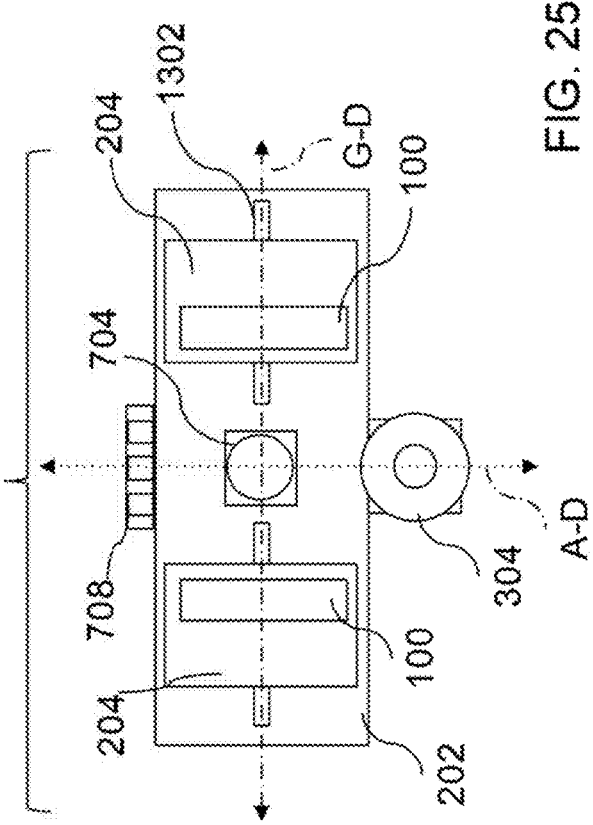
Figure 25C:
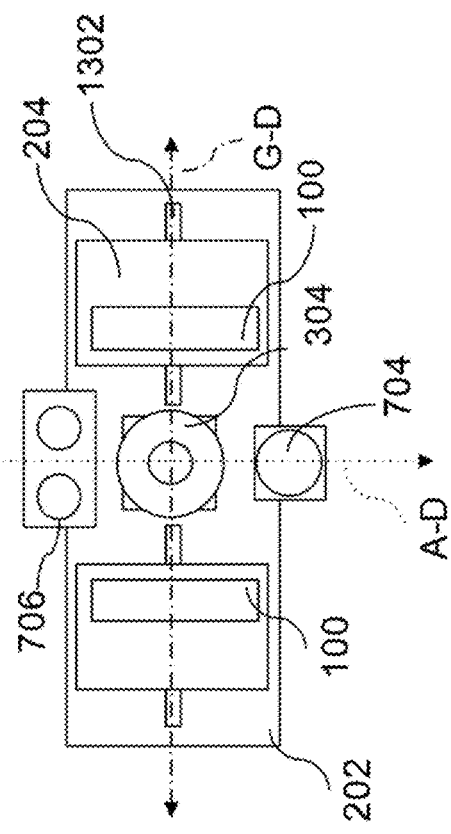

FIGS. 25A-25C and 26A-26C show bottom schematic views of gripper hubs 202 equipped with different components in different combinations as discussed herein. FIGS. 25A-25C show a substantially bilaterally symmetric gripper hub 202 with two fingers 100, and FIGS. 26A-26C show a substantially trilaterally symmetric gripper hub 202 with three fingers 100. Symmetry and finger count may be of higher orders. As shown in FIGS. 25A-25C and 26A-26C, the gripper hub 202 may have an axial center region about an axial center line, a plurality of grasping directions G-D being radially symmetric about the axial center line, and a plurality of accessory directions A-D being defined between adjacent grasping directions G-D. The soft robotic fingers 100 may be arranged along the grasping directions and be configured as generally described herein, e.g., to curl in a first degree of freedom along the grasping direction G-D when the finger actuator applies the pressure change within the internal void. A first accessory acting along the axial center line may be positioned in the axial center region. In FIGS. 25A and 26B, the axial center region accessory is a camera 704, while in FIGS. 25B-25C, 26A and 26C, the axial center region accessory is a vacuum chuck or suction cup 304 (optionally, as discussed herein, extendable from the hub 202 along the axial center line).

A second accessory may act parallel to the axial center line CA, and may be positioned along an accessory direction A-D adjacent the axial center region. In FIG. 25A, the accessory direction A-D holds an illuminator 708 and a vacuum chuck or suction cup 304, and in FIG. 25B, the accessory direction A-D holds a pair of cameras 204 bracketing the vacuum chuck or suction cup 304. In FIG. 25B, as well as in FIGS. 26A and 26C, the pair of cameras 704 may be arranged to having overlapping FOVs and/or to provide parallax observations of the fingers 100 or suction cup 304, and alternatively or in addition to measure distance via binocular range finding. The overlapping FOVs, parallax observation, and binocular vision may be used in the camera recognition systems and processes discussed herein with reference to FIGS. 27A-27C and 28A-28C. In FIG. 25C, the accessory directions A-D are occupied by the aforementioned pair of cameras 704, as well as by an optical, IR, and/or laser range finder 706 (e.g., time of flight, phase difference, triangulating). In FIG. 26A and FIG. 26C, the accessory directions are occupied by the pair of cameras 704, illumination 708, and by a rangefinder 706. It should be noted that the illumation 708 (e.g., an array of LED lights) may create shadows of the article, fingers 100, and/or suction cup 304 and extension 309, one upon the other or upon the environment, and the shadows may be observed as the characteristic employed in the camera recognition systems and processes discussed herein with reference to FIGS. 27A-27C and 28A-28C. In FIG. 26B, the accessory directions A-D are occupied by a vacuum chuck or suction cup 304 and by illumination 708.

Accordingly, by arranging the accessories along the accessory direction A-D, independent of and without interference of either the curling motion or the clamping motions in the grasping direction G-D, complementary functions including the suction cup lift and functional observations may be accomplished together with the primary gripping function. The accessories may be selected from the vacuum chuck extendible in a direction parallel to the axial center line, the camera having an optical axis extending in a direction parallel to the axial center line, the range finder having a ranging axis extending in a direction parallel to the axial center line, and the illumination illuminating at least partially the same area as the camera observation.

With respect to the camera 704, the controller 136 may be connected to the camera 704 and the finger actuator 120 (and/or motor driver 207a, driving motor 207 actuating actuator 206), and configured to compare an observation of the soft robotic fingers 100 to a reference state to determine an ungrasped state (e.g., where the fingers 100 are neutral, idle and/or curled open), and/or an article grasping state (e.g., where the fingers 100 are translated, rotated, and/or curled inward and have captured an article) and/or an empty grasping state (e.g., where the fingers 100 are translated, rotated, and/or curled inward yet have not captured an article). The empty grasping state may have a recognizable variation in a partial grasping state (where the article is not securely grasped). One response to detecting an empty grasping state would be to try again, in which case the controller 136 may instructing the finger actuator 120 (and/or motor driver 207a, driving motor 207 actuating actuator 206), to, e.g., apply pressure, to change from an empty grasping state to an ungrasped state after the empty grasping state is determined.

Examples are shown in FIGS. 27A-27C, each of which depicts a side view of one of the aforementioned states as well a field of view (FOV) from the perspective of a camera 704 (in this case, mounted in the central axis region). In FIGS. 27A-27C, neither the linkages for translating or rotating the fingers 100 nor the suction cup 304 are shown (the camera recognition described herein may work with or without the linkage or suction cup functions).

In FIG. 27A, the article (e.g., 402, 404, 406, 408, or 502) has not yet been grasped, the fingers 100 being in a curled outward position, and the article is relatively distant from the gripper hub 202. Accordingly, within the field of view FOV, the proportion of the scene (e.g., measured in pixels, or blocks, or area) obscured or occupied by the fingers 100 is relatively low, as is the proportion of the scene obscured or occupied by the article. By recognizing a characteristic of the fingers 100 associated with the area or proportion or shape obscured or occupied (e.g., a color using an RGB sensor or filter, a texture, or indicia), such as a low or relatively lower threshold value corresponding to the obscured or occupied finger 100 area, the controller 136 may recognize an ungrasped state.

In FIG. 27B, the article (e.g., 402, 404, 406, 408, or 502) has been grasped, the fingers 100 being in a curled inward position, and the article is relatively close to the gripper hub 202. Accordingly, within the field of view FOV, the proportion of the scene (e.g., measured in pixels, or blocks, or area) obscured or occupied by the fingers 100 is relatively higher, as is the proportion of the scene obscured or occupied by the article. The article obstructs the fingers 100, reducing the finger 100 area that may be observed. By recognizing a characteristic of the fingers 100 associated with the area or proportion or shape obscured or occupied such as being below a high or relatively higher threshold value corresponding to the obscured or occupied finger 100 area, the controller 136 may recognize an article grasping state.

In FIG. 27C, the article (e.g., 402, 404, 406, 408, or 502) has not been successfully grasped, the fingers 100 are in a curled inward position, and the article is absent (or may be behind or obscured by the closed fingers, not shown). Accordingly, within the field of view FOV, the proportion of the scene (e.g., measured in pixels, or blocks, or area) obscured or occupied by the fingers 100 is again relatively higher. The finger 100 area that may be observed is higher or even a maximum. By recognizing a characteristic of the fingers 100 associated with the area or proportion or shape obscured or occupied, such as being above a high or relatively higher threshold value corresponding to the fully observable 100 area, the controller 136 may recognize an empty grasping state.

In each of FIGS. 27A through 27C, the gripper hub 202 has an axial center region about an axial center line (as also shown in FIGS. 20B and 25A), and the camera 704 is positioned in the axial center region and is configured to direct the optical axis of the camera along the axial center line. The reference state may include a predetermined proportion of the field of view FOV corresponding to a recognized characteristic of the soft robotic fingers 100, in particular, the empty grasping state, as this is the state that most needs a "retry".

The camera recognition of the ungrasped, article grasping, and empty grasping states may work together with, or independently of, observing an extension state and/or a successful suction cup holding state of the suction cup 304. For example, where an astrictive effector such as the suction cup 304 is used to apply an astrictive force, and an extending and retracting extension linkage 309 (extending and retracting in perpendicular direction to the grasping direction) connects the astrictive effector and the gripper hub 202, the controller 136 may alternatively or in addition be configured to compare an observation of the soft robotic fingers 100 and/or extension linkage 309 to one or more reference states to determine whether the article is successfully grasped.

In FIG. 28A, the article (e.g., 402, 404, 406, 408, or 502) has been captured or is about to be captured by the suction cup 304, and the article is relatively distant from the gripper hub 202. Accordingly, within the field of view FOV, the proportion of the scene (e.g., measured in pixels, or blocks, or area) obscured or occupied by the suction cup 304 and/or extension linkage 309 is relatively low, as is the proportion of the scene obscured or occupied by the article. By recognizing a characteristic of the suction cup 304 and/or extension linkage 309 associated with the area or proportion or shape obscured or occupied (e.g., a color using an RGB sensor or filter, a texture, or indicia), such as a low or relatively lower threshold value corresponding to the obscured or occupied suction cup 304 or extension linkage 309 area, the controller 136 may recognize a pre-capture state (and, e.g., calibrate an expected area or other characteristic according to the distant suction cup 304 and/or article).

In FIG. 28B, the article (e.g., 402, 404, 406, 408, or 502) has been captured, and the article is relatively close to the gripper hub 202. Accordingly, within the field of view FOV, the proportion of the scene (e.g., measured in pixels, or blocks, or area) obscured or occupied by the suction cup 304, extension linkage 309 is relatively higher, as is the proportion of the scene obscured or occupied by the article. By recognizing a characteristic of the suction cup 304 and/or extension linkage 309 associated with the area or proportion or shape obscured or occupied such as being below a high or relatively higher threshold value corresponding to the obscured or occupied suction cup 304 and/or extension linkage 309 area, the controller 136 may recognize a successful suction capture state.

In FIG. 28C, the article (e.g., 402, 404, 406, 408, or 502) has not been successfully captured, and the article is absent (or may be distant). Accordingly, within the field of view FOV, the proportion of the scene (e.g., measured in pixels, or blocks, or area) obscured or occupied by the suction cup 304 and/or extension linkage 309 is again relatively higher. The suction cup 304 and/or extension linkage 309 area that may be observed is higher or even a maximum. By recognizing a characteristic of the suction cup 304 and/or extension linkage 309 associated with the area or proportion or shape obscured or occupied, such as being above a high or relatively higher threshold value corresponding to the fully observable area, the controller 136 may recognize a failed suction capture state.

In the case where the linkages connect each soft robotic finger 100 to the gripper hub 202 and change a pose of the connected soft robotic finger 100 relative to the hub 202, the camera 704 may be arranged to have a field of view FOV and/or focus configured to observe the soft robotic fingers 100 in a range or plurality of poses of the connected soft robotic finger 100 relative to the hub 202. In the case where an extension linkage connects an astrictive effector and the hub as described, the camera 704 may have a field of view FOV and/or focus configured to observe the soft robotic fingers 100 in any of an ungrasped, article grasping, and empty grasping state, as well as observe the extension linkage 309 in unextended and extended states.

It should be noted that the grip pads 208 of FIGS. 4A, 4B may be employed with any of the structures of FIGS. 20-28 inclusive. In this case, a plurality of grip pads 208 are provided, each grip pad respectively connected to a translating member of a linkage, and each grip pad 208 being configured to apply a clamping force when the translating member is moved. As described, the linkage actuators 206, driving motor, or motor driver 207*a* may be configured to cause the linkages to move. The controller 136 may be configured to, in a first mode, activate the linkage actuators (e.g., 205, 207, 207*a*) to cause the translating members of the linkages to move to apply the clamping force to a first article (e.g., article 404), and in a second mode, activate the finger actuator 120 to cause the soft robotic fingers 100 to curl to apply a grasping force to a second article (e.g., article 402, 406, and/or 408). This is generally shown in FIGS. 4A, 4B.

In this case, in a third mode, the controller 136 may activate the finger actuator 120 to cause the soft robotic fingers 100 to curl to apply the grasping force to the second article 404 and activate the linkage actuators 206, 207, 207*a* to cause the translating members of the linkages to move to apply a portion of the clamping force via the soft robotic fingers 100 to the same second article (e.g., article 402, 406, and/or 408). The controller 136 may further be configured in the third mode to successively actuate one of the linkage actuators 206, 207, 207*a* or the finger actuators 120, then the remaining one of the linkage actuators 206, 207, 207*a* or the finger actuators 120 to combine the portion of the clamping force and the grasping force. The controller may be alternatively or in addition configured in the third mode to simultaneously actuate the linkage actuators 206, 207, 207*a* and the finger actuators 120 to combine the portion of the clamping force and the grasping force.

When applying the clamping force and the grasping force to a same article (e.g., via the fingers 100) the controller soft robotic system according to claim 19, the controller 136 may be further configured in the third mode to maintain the grasping force and clamping force in a predetermined relationship to one another.

In another implementation of multiple modes, employing the grip pads 208 as integrated to any capable one of the structures discussed herein, the controller 136 may be configured to activate the linkage actuators 206, 207, 207*a* to cause the translating members of the linkages to move to apply the clamping force to an article (e.g., article 402, 406, and/or 408), and to activate the finger actuators to cause the soft robotic fingers to curl to apply a grasping force to the same article (e.g., article 402, 406, and/or 408). The controller 136 may be configured to, in a first mode, successively actuate one of the linkage actuators 206, 207, 207*a* or the finger actuators 120, then the remaining one of the linkage actuators 206, 207, 207*a* or the finger actuators 120 to combine the clamping force and the grasping force, and in a second mode, simultaneously actuate the linkage actuators 206, 207, 207*a* and the finger actuators 120 to combine the clamping force and the grasping force. Again, the controller 136 may be is further configured to maintain the grasping force and clamping force in a predetermined relationship to one another.

With these structures, with or without the grip pads 208 or linkage actuation via actuators 206, 207, 207*a*, the suction cup 304, mounted on the extension actuator, may be configured to apply a vacuum force to the article. The suction cup 304 may creating a vacuum force when the suction cup actuator applies a second pressure change (independent of the finger 100 pressure change). In this case, the controller 136 may be further configured in an additional mode, activate the suction cup actuator and extension actuator to cause the suction cup to contact the article, lift the article by the vacuum force, and retract the article toward the hub 202. In this case, the controller 136 may be further configured to complete this suction cup mode before the first or second mode previously described.

Alternatively, or in addition, the controller 136 may be configured to employ the suction cup mode as a primary mode, and in a first mode, activate the suction cup actuator and extension actuator to cause the suction cup 304 to contact the article, lift the article by the vacuum force, and retract the article toward the hub, and in a second mode, activate the finger actuator 120 to cause the soft robotic fingers to curl to apply a grasping force to the article. In this case, the controller may, complete the first mode before the second mode. Alternatively, or in additional mode, the controller 136 may start the second mode before the first mode completely retracts the article toward the hub.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Any or all of the above-described techniques may be implemented by suitable hardware, including pneumatic, hydraulic, mechanical, electrical, magnetic, etc. hardware. Some embodiments may utilize logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

As used herein, structures, acts, steps, and functions are given various names or labels. This paragraph describes terminology that is used alternatively, in some cases interchangeably, and in some cases equivalently. Generally, one of skill in the art will recognize and understand identity, equivalency, and the similarities and differences among alternative terms of art and/or words having a plain technical meaning. As used herein, an end effector may include an effector including a tool or one to which a tool may be mounted, including EOAT 202 and the like. Bendable members may include soft robotic members such as soft robotic actuators 100.

We claim:

1. A soft robotic grasping system for grasping an article, comprising:
 a gripper hub;
 a finger actuator that applies a pressure change;
 a plurality of soft robotic fingers supported by the hub, each soft robotic finger including an elastomeric outer surface surrounding an internal void, and each soft robotic finger being configured to curl when the finger actuator applies the pressure change within the internal void;
 a camera having a field of view configured to observe the soft robotic fingers in any of a ungrasped, article grasping, and empty grasping state; and
 a controller connected to the camera and the finger actuator, configured to compare an observation of the soft robotic fingers to a reference state to determine an ungrasped, article grasping or empty grasping state of the soft robotic fingers, the controller instructing the finger actuator to apply pressure to change from an empty grasping state to an ungrasped state after the empty grasping state is determined.

2. The soft robotic grasping system according to claim 1, wherein
 the gripper hub has an axial center region about an axial center line, and the camera is positioned in the axial center region and is configured to direct an optical axis of the camera along the axial center line.

3. The soft robotic grasping system according to claim 1, further comprising:
 an astrictive effector configured to apply an astrictive force; and an extension linkage connecting the astrictive effector and the hub, the extension linkage being configured to extend and retract the astrictive effector along a direction perpendicular to the grasping direction, the controller configured to compare an observation of the soft robotic fingers and/or extension linkage to at least one reference state to determine whether the article is successfully grasped.

4. The soft robotic grasping system according to claim 1, further comprising:
at least one linkage connecting each soft robotic finger to the hub, each linkage being configured to change a pose of the connected soft robotic finger relative to the hub, wherein the camera having a field of view and focus are configured to observe the soft robotic fingers in a plurality of poses of the connected soft robotic finger relative to the hub.

5. The soft robotic grasping system according to claim 1, wherein the reference state includes a predetermined proportion of the field of view corresponding to a recognized characteristic of the soft robotic fingers in the empty grasping state.

6. A soft robotic grasping system for grasping an article, comprising:
a gripper hub;
a finger actuator that applies a pressure change;
a plurality of soft robotic fingers, each soft robotic finger being arranged along a grasping direction and including an elastomeric outer surface surrounding an internal void, and each soft robotic finger being configured to curl in a first degree of freedom along the grasping direction when the finger actuator applies the pressure change within the internal void;
an astrictive effector configured to apply an astrictive force;
an extension linkage connecting the astrictive effector and the hub, the extension linkage being configured to extend and retract the astrictive effector along a direction perpendicular to the grasping direction;
a camera having a field of view configured to observe the soft robotic fingers in any of a ungrasped, article grasping, and empty grasping state and the extension linkage in unextended and extended states; and
a controller connected to the camera, the controller configured to compare an observation of the soft robotic fingers and/or extension linkage to at least one reference state to determine whether the article is successfully grasped.

7. The soft robotic grasping system according to claim 6, wherein
the gripper hub has an axial center region about an axial center line, the camera is positioned in the axial center region and is configured to direct an optical axis along the axial center line, and the astrictive effector and extension linkage are positioned adjacent the axial center region and configured to direct the extension of the astrictive effector parallel to the axial center line.

8. The soft robotic grasping system according to claim 6, further comprising:
a plurality of linkages, each linkage respectively connecting a soft robotic finger to the hub, each linkage being configured to change a pose of the connected soft robotic finger relative to the hub; and
a plurality of linkage actuators configured to cause the linkages to move, each linkage actuator respectively connected to one of the linkages.

9. A soft robotic grasping system, comprising:
a gripper hub having an axial center region about an axial center line, a plurality of grasping directions being radially symmetric about the axial center line, and a plurality of accessory directions being defined between adjacent grasping directions;
a finger actuator that applies a pressure change;
a plurality of soft robotic fingers, each soft robotic finger being arranged along a grasping direction and including an elastomeric outer surface surrounding an internal void, and each soft robotic finger being configured to curl in a first degree of freedom along the grasping direction when the finger actuator applies the pressure change within the internal void;
a first accessory acting along the axial center line being positioned in the axial center region; and
a second accessory acting parallel to the axial center line being positioned along an accessory direction adjacent the axial center region, wherein the first and second accessories are selected from a vacuum chuck extendible in a direction parallel to the axial center line, a camera having an optical axis extending in a direction parallel to the axial center line, and a range finder having a ranging axis extending in a direction parallel to the axial center line.

10. The soft robotic grasping system according to claim 9, wherein
the camera is positioned in the axial center region and is configured to direct the optical axis along the axial center line, and the vacuum chuck is positioned adjacent the axial center region and configured to extend in the direction parallel to the axial center line.

11. The soft robotic grasping system according to claim 9, further comprising:
a plurality of linkages, each linkage respectively connecting a soft robotic finger to the hub, and each linkage being configured to change a pose of the connected soft robotic finger along the grasping direction.

12. The soft robotic grasping system according to claim 11, further comprising:
a plurality of linkage actuators configured to cause the linkages to move, each linkage actuator respectively connected to one of the linkages.

13. A soft robotic grasping system for grasping an article, comprising:
a gripper hub;
a plurality of soft robotic fingers, each soft robotic finger including an elastomeric outer surface surrounding an internal void, and each soft robotic finger being configured to curl in a first degree of freedom when the respective soft robotic finger applies a pressure change within the internal voids;
a plurality of linkages, each linkage respectively connecting a soft robotic finger to the hub, each linkage being configured to guide in a second degree of freedom to change a pose of the connected soft robotic finger relative to the hub;
a plurality of linkage actuators configured to cause the linkages to move, each linkage actuator respectively connected to one of the linkages;
a camera having a field of view configured to observe the soft robotic fingers in any of an ungrasped, article grasping, and empty grasping state;
a controller connected to the camera, the controller configured to compare an observation of the soft robotic fingers to at least one reference state to determine whether the soft robotic fingers are in the ungrasped, article grasping, or empty grasping state;

an astrictive effector configured to apply an astrictive force; and an extension linkage connecting the astrictive effector and the hub, the extension linkage being configured to extend and retract the astrictive effector along a direction perpendicular to a grasping direction, wherein the camera is further configured to observe the extension linkage in unextended and extended states; wherein the controller is further configured to compare an observation of the extension linkage to at least one reference state.

14. The soft robotic grasping system according to claim 13, wherein the at least one reference state includes a predetermined proportion of the field of view corresponding to a recognized characteristic of the soft robotic fingers in at least one of the ungrasped, article grasping, and empty grasping state.

15. A soft robotic grasping system for grasping an article, comprising:

a gripper hub;

a finger actuator that applies a first pressure change;

a suction cup actuator that applies a second pressure change;

an extension actuator that extends away from or retracts toward the hub;

a plurality of soft robotic fingers, each soft robotic finger including an elastomeric outer surface surrounding an internal void, and each soft robotic finger being configured to curl in a first degree of freedom when the finger actuator applies the pressure change within the internal voids;

a suction cup configured to apply a vacuum force to the article, the suction cup being mounted to the extension actuator and configured to move toward or away from the hub, the suction cup creating a vacuum force when the suction cup actuator applies the second pressure change; and a controller configured to, in a first mode, activate the suction cup actuator and extension actuator to cause the suction cup to contact the article, lift the article by the vacuum force, and retract the article toward the hub, and in a second mode, activate the finger actuator to cause the soft robotic fingers to curl to apply a grasping force to the article, wherein the controller is further configured to, in a third mode, complete the first mode before the second mode.

16. The soft robotic system according to claim 15, wherein the controller is further configured to, in a fourth mode, start the second mode before the first mode completely retracts the article toward the hub.

17. The soft robotic system according to claim 15, further comprising:

a camera having a field of view configured to observe the soft robotic fingers in any of a ungrasped, article grasping, and empty grasping state, wherein the controller is further configured to compare an observation of the soft robotic fingers to a reference state to determine an ungrasped, article grasping or empty grasping state of the soft robotic fingers.

18. The soft robotic system according to claim 15, wherein the field of view of the camera is further configured to observe the suction cup in retracted and extended states of the extension actuator, and the controller is further configured to compare an observation of the suction cup to at least one reference state to determine whether the article is successfully lifted.

* * * * *